United States Patent
Verinsky et al.

(10) Patent No.: US 6,968,404 B2
(45) Date of Patent: *Nov. 22, 2005

(54) OPTICAL DRIVE CONTROLLER WITH A HOST INTERFACE FOR DIRECT CONNECTION TO AN IDE/ATA DATA BUS

(75) Inventors: Phil Verinsky, San Jose, CA (US); Michael Case, Los Altos Hills, CA (US)

(73) Assignees: Oak Technology, Inc., Sunnyvale, CA (US); Zoran Corporation, Sunnyvale, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/773,880

(22) Filed: Feb. 6, 2004

(65) Prior Publication Data

US 2004/0158658 A1 Aug. 12, 2004

Related U.S. Application Data

(63) Continuation of application No. 10/082,990, filed on Feb. 25, 2002, now Pat. No. 6,721,828, which is a continuation of application No. 09/442,866, filed on Nov. 18, 1999, now Pat. No. 6,546,440, which is a continuation of application No. 08/673,327, filed on Jun. 28, 1996, now Pat. No. 6,584,527, which is a continuation of application No. 08/264,361, filed on Jun. 22, 1994, now Pat. No. 5,581,715.

(51) Int. Cl.[7] ............................................. G06F 13/12
(52) U.S. Cl. ............................ 710/62; 710/2; 710/129
(58) Field of Search ................................. 710/2, 52, 62, 710/74, 129; 369/34, 44; 345/501

(56) References Cited

U.S. PATENT DOCUMENTS

| | | |
|---|---|---|
| 4,698,810 A | 10/1987 | Fukuda et al. |
| 4,991,169 A | 2/1991 | Davis et al. |
| 5,261,072 A | 11/1993 | Siegel |
| 5,295,247 A | 3/1994 | Chang et al. |
| 5,313,585 A | 5/1994 | Jeffries et al. |

(Continued)

FOREIGN PATENT DOCUMENTS

| | | |
|---|---|---|
| EP | 0689207 A1 | 12/1995 |
| WO | WO 93/09500 | 5/1993 |

OTHER PUBLICATIONS

*Initial Determination,* In the Matter of Certain CD–ROM Controllers and Products Containing the Same II, Inv. No. 337–TA–409, U.S. International Trade Commission, Public Version, stamp dated Jun. 11, 1999, Table of Contents and pp. 73–75.

*Recommended Determination Concerning Respondent's Motion for Sanctions,* In the Matter of Certain CD–ROM Controllers, and Products Containing Same—II, Inv. No. 337–TA–409, U.S. International Trade Commission, Public Version, stamped received date Oct. 22, 1999, (61 pp. total).

(Continued)

*Primary Examiner*—Lynne H. Browne
*Assistant Examiner*—Thuan Du
(74) *Attorney, Agent, or Firm*—Blakely, Sokoloff, Taylor & Zafman LLP

(57) ABSTRACT

A compact disk drive controller to control the access of information from an optical compact disk (CD) digital data storage device by a host computer using an integrated drive electronics (IDE) data bus or an industry standard architecture (ISA) data bus is disclosed. A digital signal processor (DSP) interface to the drive electronics of the CD drive, a dynamic random access memory (DRAM) controller, an error correction code (ECC) data corrector, an error detection and correction (EDC) device employing cyclical redundancy checking techniques (EDC/CRC), and a host computer interface are described.

68 Claims, 25 Drawing Sheets

U.S. PATENT DOCUMENTS

| | | | |
|---|---|---|---|
| 5,337,409 A | | 8/1994 | Sakata |
| 5,359,698 A | | 10/1994 | Goldberg et al. |
| 5,379,284 A | | 1/1995 | Kim |
| 5,408,477 A | | 4/1995 | Okada et al. |
| 5,418,910 A | | 5/1995 | Siegel |
| 5,434,722 A | | 7/1995 | Bizjak |
| 5,446,877 A | * | 8/1995 | Liu et al. .................. 714/1 |
| 5,485,440 A | | 1/1996 | Ogino |
| 5,499,252 A | | 3/1996 | Watanabe |
| 5,535,327 A | | 7/1996 | Verinsky et al. |
| 5,581,715 A | | 12/1996 | Verinsky et al. |
| 5,581,716 A | | 12/1996 | Park |
| 5,623,700 A | | 4/1997 | Parks et al. |
| 5,701,450 A | | 12/1997 | Duncan |
| 5,802,398 A | | 9/1998 | Liu et al. |
| 5,805,921 A | * | 9/1998 | Kikinis et al. ............ 710/2 |

OTHER PUBLICATIONS

*Notice of Final Determination and attached Order,* In the Matter of Certain CD–ROM Controllers and Products Containing the Same—II, Inv. No. 337–TA–409, U.S. International Trade Commission, Corrected Version, stamp dated Sep. 28, 1999, (9 pp. total).

*Commission Opinion,* In the Matter of Certain CD–ROM Controllers and Products Containing Same—II, Inv. No. 337–TA–409, International Trade Commission, Public Version, stamped received Oct. 20, 1999, (89 pp. total).

*Denial of Motion for Sanctions: Vacatur of Recommended Determination,* In the Matter of Certain CD–ROM Controllers and Products Containing Same—II, Inv. No. 337–TA–409 (2 pp.) attached Order (2 pp.) and attached Certificate of Service (1 pp.), U.S. International Trade Commission, stamp received dated Dec. 13, 1999).

Offer for Sale, letter dated May 19, 1993 to David D. Tsang, President, Oak Technology, from Masafumi Kaneko, General Manager, Optical Media Product Division, NEC Home Electronics Co., Ltd. (3 pages), Memorandum signed by David D. Tsang on May 27, 1993 and Masafumi Kaneko on May 28, 1993 (1 page).

Memorandum dated Apr. 20, 1994 to Don Bryson, cc: Scott Alberts, Mike Hetzel, From Peter Brown, Re: Barrier Plan (2 pages).

Draft Proposed American National Standard—AT Attachment Prepared by X3T9—I/O Interface, Accredited Standards Committee—X3 Information Processing Systems (56 pp.), Feb. 10, 1992, X3.221–199x, X3T9.2/90–143.

Sanyo LC8950 & LDC8951, Real–Time Error Correction and Host Interface Processors for CD–I and CD–ROM Applications, Application Note to No. E89, Sanyo Electric Co., Ltd. Semiconductor Division, First English edition: Apr. 1988, Revised to include LC8951: Jun. 1989 (118 pages), Contents (i–ii), List of Figures (iii–iv), List of Tables (v).

Oak Technology, Inc. OTI–012 Overview dated Nov. 11, 1991 (2 pgs.), 5 diagrams (5 pgs.), Oak Technology, Inc. Memorandum to: Mr. Sugie @ Mitsumi Dallas Office, from: Phil Verinsky @ Oak Technology, Inc., Date: Mar. 10, 1992, CC: James Ou, Aki Tanaka, Peter Brown, Kenji Fujimoto, Subject: OTI012 Production Package (3 pp. & 2 pp. of diagrams).

Oak Technology, Incorporated Preliminary Specification OTI–012 CD–ROM Controller Chip, Mar. 20, 1992, Copyright 1992 Oak Technology, Inc. Printed in USA (72 pp.), Table of Contents (1 p.), Overview (1 p.), Appendix (A–1 to A–3).

Proposal for a Working Draft, Revision A1.3, Jun. 10, 1993, 11:32 am, ATAPI CD–ROM Standard, Deposition Exhibit 653 Shahani, Oct. 9, 1998 (130 pp.), Table of Contents (pp. 3–6), List of Tables (pp. 7–8, List of Figures (pp. 9–10).

Memorandum dated Feb. 19, 1993 pertaining to the Mitsumi prototype, To: P. Verinsky, CC: M. Case, W. Wang, From: A. Tanaka, Re: IDE Prototype Summary (4 pages).

OTI–011 IDE CD–ROM Controller Engineering Specification Rev. 1.1, Nov. 2, 1992, (19 pp.), Contents (1 p.), Overview (1 p.).

OTI–011 microcontroller controller register chart showing the QTI–011 registers for communication with a microcontroller (RX–10C; RX–16C; RX–22C, RX–153C (CD ROM Interface Status),(Apr. 21, 1993) (5 pp.).

OTI–011 IDE Interface Control Registers (from the microcontroller's perspective) (2 pp.).

Oak employee Don Smith's 2/93 design notes describing the OTI–O11 registers, including the direct access feature for the PDIAG, DASPEN, and clear BSY signals (RX–20C; Verinsky 1029–1032), (1 page).

Claimed inventor Verinsky's 3/93 IDE/Host Checklist referring to an HIRQ pin for generating host interruption requests (RX–17C; Verinsky Tr. 1032–1034, H:\... Mike.Txt (2 pp).

*Order No. 16: Concerning the Declassification of Certain Filings and the Admission of Certain Exhibits,* In the Matter of: Certain CD–ROM Controllers and Products Containing Same—II, Investigation No. 337–TA–409, U.S. International Trade Commission, Order signed by Sidney Harris, Administration Law Judge Issued May 12, 1999 (5 pages).

*Petition for Review of Final Initial Determination of Complainant Oak Technology, Incorporated,* In the Matter of: Certain CD–ROM Controllers and Products Containing Same II, Investigation No. 337–TA–409, by Joel M. Freed, Stephen J. Rosenman, Edwin H. Wheeler, Howrey & Simon, Counsel for Complainant, Oak Technology Incorporated, U.S. International Trade Commission, stamped received May 24, 1999 (62 pages), Table of Contents (i–iii), Table of Authorities (iv–vi), Appendix to Petition for Review of Final Initial Determination of Complainant Oak Technology, Incorporated (10 pages).

Disk–Drive Controllers Automate Data Flow, R. Nass, Electronic Design Article No. 20, Oct. 1, 1992,pp. 79–80, 82, & 85.

*Complaint Oak Technologies Incorporated's Responsive Brief Regarding the Commissioner's Review of Final Initial Determination and Order No. 15,* In the Matter of: Certain CD–ROM Controllers and Products Containing Same II, Investigation No. 337–TA–409, by Joel M. Freed, Michael J. Songer, Bert C. Reiser, Howrey & Simon, Counsel for Complainant, Oak Technology Incorporated, U.S. International Trade Commission, Before the Honorable Sidney Harris Administrative Law Judge, stamped received Jul. 20, 1999 (73 pages), Table of Contents (pgs. i–iv), Table of Authorities (v–viii).

IDE/ATE Disk Interface Hits the Wall, B.C. Cole, Electronic Engineering Times Special Report—Design, May 3, 1993, pp. 46–50.

Compact Disc Terminology by James R. Fricks, Disc Manufacturing Inc., Rev. 1.0 6/92, 1992.

International Search Report dated Apr. 6, 1998 for PCT/US 97/21242.

US Court of Appeals for the Federal Circuit, Doc #00–1078, Oak Technology vs. Mediatek, United Microelectronics, Lite–On Technology and Aopen, Inc., 30 pages, May 2, 2001.

Written Opinion, date of mailing Sep. 9, 1998, Application No. PCT/UUS97/21242, filing date Nov. 19, 1997, Patent Classification G06F3/06.

Declaration of Robert G. Wedig, Investigation No. 337–TA–409 by the United States International Trade Commission, 57 pages.

Portions of Application Note No. E89, Sanyo Technical Reference Manual Manual No. Sanyo LC8950 & LC8951, Apr. 1988, Cover, contents, pp. 64–68, 84–85.

Letter from Howrey Simon Arnold & White, LLP, dated Oct. 30, 2000, Re *Citation of Supplemental Authority—Oak Technology, Incorporated v. International Trade Commission, Appeal No. 001–1078,* to the Honorable Jan Horbaly, U.S. Court of Appeals for the Federal Circuit, by Hand Delivery.

Letter from Timothy P. Monaghan, Office of General Counsel, United States International Trade Commission, date Nov. 7, 2000, Re Citation of Supplemental Authority—Oak Technology, Incorporated v. International Trade Commission, Appeal No. 001–1078, to the Honorable Jan Horbaly, U.S. Court of Appeals for the Federal Circuit.

Nonconfidential Brief of an Appellant Oak Technology, Inc.; Appeal No. 00–1078; United States Court of Appeals For the Federal Circuit, *Oak Technology Inc. v. International Trade Commission and Mediatek, Inc. United Microelectronics Corp., Lite–On Technology Corp., and AOPEN, Inc.;* On Appeal from the United States International Trade Commission in Investigation No: 337–TA–409; Joel M. Freed, Esq., Michael J. Songer, Esq., Christopher L. Kelley, Esq., Thomas C. Fiala, Esq.; Howrey Simon and Arnold & White, LLP, dated Feb. 24, 2000.

Brief of Appellee United States International Trade Commission, United States Court of Appeals for the Federal Circuit; *Oak Technology, Inc. v. International Trade Commission and Mediatek, Inc., United Microelectronics Corp., Lite–On Technology Corp., and AOPEN, Inc.;* On Appeal from the United States International Trade Commission in Investigation No. 337–TA–409; Appeal No. 00–1078; Timothy P. Monaghan, Attorney, Lyn M. Schlitt, James A. Toupin, Office of the General Counsel, U.S. International Trade Commission, dated Apr. 7, 2000.

Corrected Brief of Intervenors Mediatek, Inc., United Microelectronics Corp., Lite–On Tech. Corp., and AOPEN, Inc.; Appeal No. 00–1078; United States Court of Appeals for the Federal Circuit, Oak Tech., Inc. v. International Trade Commission and Mediatek, Inc., United Microelectronics Corp., Lite–On Tech. Corp. and AOPEN, Inc.; On Appeal from the U.S. International Trade Commission in Investigation No. 337–TA–409; Michael A. Landra, Esq., James C. Otteson, Esq., Lisa G. McFall, Esq., Wilson, Sonsini, Goodrich & Rosati, dated Apr. 13, 2000.

Nonconfidential Joint Appendix vol. I; pp. 1–416; Appeal No. 00–1078, United States Court of Appeals for the Federal Circuit, Oak Technology, Inc., v. International Trade Commission, Mediatek, Inc., United Microelectronics Corp., Lite–On Technology Corp., and Aopen, Inc.: On Appeal from the United States International Trade Commission in Investigation No: 337–TA–409; Joel M. Freed, Esq., Michael J. Songer, Esq., Christopher L. Kelley, Esq., Thomas C. Fiala, Esq., Howrey Simon Arnold & White, LLP. May 1, 2000.

Nonconfidential Joint Appendix vol. II; pp. 417–913,; Appeal No. 00–1078, United States Court of Appeals for the Federal Circuit, Oak Technology, Inc., v. International Trade Commission, Mediatek, Inc., United Microelectronics Corp., Lite–On Technology Corp., and Aopen, Inc.: On Appeal from the United States International Trade Commission in Investigation No. 337–TA–409; Joel M. Freed, Esq., Michael J. Songer, Esq., Christopher L. Kelley, Esq., Thomas C. Fiala, Esq., Howrey Simon Arnold & White, LLP. May 1, 2000.

Nonconfidential Joint Appendix vol. III; pp. 914–2423: Appeal No. 00–1078, United States Court of Appeals for the Federal Circuit, Oak Technology, Inc., v. International Trade Commission, Mediatek, Inc., United Microelectronics Corp., Lite–On Technology Corp., and Aopen, Inc.: On Appeal from the United States International Trade Commission in Investigation No: 337–TA–409; Joel M. Freed, Esq., Michael J. Songer, Esq., Christopher L. Kelley, Esq., Thomas C. Fiala, Esq., Howrey Simon Arnold & White, LLP. May 1, 2000.

Reply Brief of Appellant Oak Technology, Incorporated; United States Court of Appeals for the Federal Circuit, Oak Technology, Inc., v. International Trade Commission, and Mediatek, Inc., United Microelectronics Corp., Lite–On Technology Corp., and Aopen, Inc.: On Appeal from the United States International Trade Commission in Investigation No: 337–TA–409; Joel M. Freed, Esq., Michael J. Songer, Esq., Christopher L. Kelley, Esq., Thomas C. Fiala, Esq., Howrey Simon Arnold & White, LLP, dated May 11, 2000.

Letter dated Nov. 20, 2001 from James C. Otteson of Wilson, Sonsini, Goodrich & Rosati to the Honorable Ronald M. Whyte via hand delivery regarding *Oak Technology, Inc. v. United Microelectronics Corporation,* Case No. 97–20959 RMW (2 pgs).

Letter dated Nov. 13, 2001 from Michael A. Ladra of Wilson, Sonsini, Goodrich & Rosati to the Honorable Ronald M. Whyte via hand delivery regarding *Oak Technology, Inc. v. United Microelectronics Corporation,* Case No. 97–20959 RMW (4 pgs).

Order re *Oak Technology, Inc. v. United Microelectronics Corporation,* Case No. C 97–20959 RMW (Consolidated with C 97–21126 RMW) In the United States District Court, For the Northern District of California, San Jose Division, signed by Ronald M. Whyte, United States District Judge (3 pgs).

[Proposed] First Amendment Answer and Counterclaims of United Microelectronics Corporation re *Oak Technology, Inc. v. United Microelectronics Corporation,* Case No. 97–20959 RMW (ARB) dated Aug. 10, 2001 (19 pgs).

Order Granting Plaintiff Oak Technology's Motion to Dismiss Declaratory Relief Claims and Denying United Microelectronics' Counter–Motion for Leave to Amend re *Oak Technology, Inc. v. United Microelectronics Corporation*, Case No. 97–20959 RMW dated Oct. 10, 2001 and signed by Ronald M. Whyte, United States District Judge on Oct. 3, 2001 (15 pgs).

United Microelectronics Corporation's Opposition to Oak Technology, Inc.'s Motion for Dismissal and Notice of Counter–Motion and Counter–Motion for Leave to Amend Counterclaims re *Oak Technology, Inc. v. United Microelectronics Corporation*, Case No. 97–20959 RMW (ARB), dated Aug. 31, 2001 (13 pgs); [Proposed] Order Denying Oak Technology, Inc.'s Motion for Dismissal and Granting United Microelectronics Corp.'s Counter–Motion for Leave to Amend Counterclaims (unsigned) (2 pgs); Certificate of Service of United Microelectronics Corporation's Opposition to Oak Technology Inc.'s Motion for Dismissal and Notice of Counter–Motion and Counter–Motion for Leave to Amend Counterclaims and [Proposed] Order Denying Oak Technology, Inc.'s Motion for Dismissal and Granting United Microelectronics Corp.'s Counter–Motion for Leave to Amend Counterclaims, dated Aug. 13, 2001 (2 pgs).

Oak Technology Inc.'s Claim Construction Brief re *Oak Technology, Inc. v. United Microelectronics Corporation*, Case No. C97–20959 RMW and *Mediatek Inc., v. Oak Technology, Inc.*, Case No. C 97–21126 RMW, dated Jul. 19, 2002 (27 pages).

Oak Technology Inc.'s Response to Defendant United Microelectronics Corporation's Invalidity Contentions Dated Jun. 28, 2002 re *Oak Technology, Inc. v. United Microelectronics Corporation*, Case No. 97–20959 RMW and *Mediatek Inc., v. Oak Technology, Inc.*, Case No. C97–21126 RMW, dated Jul. 19, 2002 (5 pages).

[Proposed] Order re Unsealing of Case File (2 pgs), Certificate of Service (Order re Unsealing of Case File) (3 pgs), Stipulation re Unsealing of Case File (3 pgs), re *Oak Technology, Inc. v. United Microelectronics Corporation*, Case No. C97–20959 RMW and Mediatek Inc., v. Oak Technology, Inc., Case No. C 97–21126 RMW, dated Jul. 30, 2002.

Defendant United Microelectronics Corporation's Opening Brief on Claim Construction Pursuant to Apr. 15, 2002 Case Management Order (23 pgs), Declaration of James C. Otteson (7 pgs), Misc. Administrative Request of Deft. for leave to File Documents Under Seal (2 pgs), Declaration of Dale E. Buscaino (4 pgs), re *Oak Technology, Inc. v. United Microelectronics Corporation*, Case No. C97–20959 RMW and *Mediatek Inc., v. Oak Technology, Inc.*, Case No. C 97–21126 RMW, dated Jun. 28, 2002.

Defendant United Microelectronics Corporation's Invalidity Contentions (3 pgs), [Proposed] Order Granting Miscellaneous Administrative Request of Defendant United Microelectronics Corporation for Leave to File Documents Under Seal (2 pgs), Confidential Exhibits to Declaration of James C. Otteson in Support of Defendant United Microelectronics Corporation's Opening Brief on Claim Construction (1 pg), Certificate of Service (3 pgs), re *Oak Technology, Inc. v. United Microelectronics Corporation*, Case No. C97–20959 RMW and *Mediatek Inc., v. Oak Technology, Inc.*, Case No. C 97–21126 RMW, dated Jun. 21, 2002.

Lawrence J. Lamers, Information Technology– AT Attachment Interface for Disk Drives, Reference No. ANSI X3.221–199x, Copyright 1994, Computer and Business Equipment Manufacture Association. (75 pages).

*Oak Technology, Inc., v. United Microelectronics Corp.*, Case No. C97020959 RMW ARB (Consolidated with Case No. C97–21126), In the United States District Court, Northern District of California, San Jose Division, *Notice of Motion and Motion for Summary Judgement that the '715 Patent is invalid under 35 U.S.C. §112. ¶¶1, 2 & 6* (21 pgs) [Proposed] Order Granting UMC's Motion for Summary Judgement that the '715 Patent is invalid under 35 U.S.C. §112, ¶¶1, 2 & 6, Certificate of Service re Motion for Summary Judgement that the '715 Patent is invalid under 35 U.S.C. §112, ¶¶1, 2 & 6, Declaration of James C. Otteson in Support of UMC's Motion for Summary Judgement that Oak's '715 Patent in invalid under 35 U.S.C. §112, ¶¶1, 2 & 6 (3 pgs), Exhibits 1–6, Exhibits A–C dated Nov. 15, 2002.

*Oak Technology, Inc., v. United Microelectronics Corp.*, Case No. C97020959 RMW ARB (Consolidated with Case No. C97–21126), In the United States District Court, Northern District of California, San Jose Division, *Oak Technology, Inc.'s Motion for Summary Judgment Against UMC's Patent Defense to Oak's Fraud Claims* (21 pgs), Declaration of Michael J. Songer in Support of Oak Technology, Inc.'s Motion for Summary Judgement Against UMC's Patent Defense to Oak's Fraud Claims (7 pgs), [Proposed] Order (2 pgs), dated Nov. 25, 2002; Certificate of Service dated Nov. 26, 2002 (2 pgs).

*Oak Technology, Inc., v. United Microelectronics Corp.*, Case No. C97020959 RMW ARB (Consolidated with Case No. C97–21126), In the United States District Court, Northern District of California, San Jose Division, *Oak Technology, Inc.'s Opposition of UMC's Motion for Summary Judgement that Oak's '715 Patent in invalid under 35 U.S.C. §112, ¶¶1, 2 & 6* (13 pgs), Declaration of Michael J. Songer in Support of Oak's Opposition to UMC's Motion for Summary Judgement that Oak's '715 Patent in valid under 35 U.S.C. §112, ¶¶1, 2 & 6 (3 pgs), [Proposed] Order (2 pgs), Exhibits 1–10, dated Nov. 29, 2002.

*Oak Technology, Inc., v. United Microelectronics Corp.*, Case No. C97020959 RMW ARB (Consolidated with Case No. C97–21126), In the United States District Court, Northern District of California, San Jose Division, *Reply Brief in Support of UMC's Motion for Summary Judgement that the '715 Patent is invalid Under 35 U.S.C. §112, ¶¶1, 2 & 6* (8 pgs), United Microelectronics Corporation's Objection to "Evidence" Offered by Oak Technology (2 pgs), Reply Declaration of James C. Otteson in Support of UMC's Motion for Summary Judgement that the '715 is invalid under 35 U.S.C. §112, ¶¶1, 2 & 6, Certificate of Service via Overnight and Hand Delivery dated Dec. 6, 2002 (2 pgs).

*Oak Technology, Inc., v. United Microelectronics Corp.,* Case No. C97020959 RMW ARB (Consolidated with Case No. 97–21126), In the United States District Court, Northern District of California, San Jose Division, *Oak Technology, Inc.'s Submission of Declaration of Robert G. Wedig in Support of Oak Technology, Inc.'s Motion for Summary Judgement Against UMC's Patent Defense to Oak's Fraud Claims dated Dec. 11, 2002* (2 pgs), *Declaration of Robert G. Wedig in Support of Oak Technology, Inc.'s Motion for Summary Judgement Against UMC's Patent Defense to Oak's Fraud Claims dated Dec. 10, 2002* (2 pgs), Certificate of Service Dated Dec. 11, 2002 (via Federal Express), letter from Arnold & Porter dated Dec. 11, 2002 to Office of the Clerk, U.S. District Court for the Northern District of California.

*Oak Technology, Inc., v. United Microelectronics Corp.,* Case No. C97020959 RMW ARB (Consolidated with Case No. C97–21126), In the United States District Court, Northern District of California, San Jose Division, *United Microelectronics Corporation's Opposition to Oak Technology, Inc.'s Motion for Summary Judgement on UMC's Patent Defense to Oak's Fraud Claim* (24 pgs), Exhibit A (6 pgs), *Declaration of James C. Otteson in Support of Microelectronics Corporation's Opposition to Oak Technology, Inc.'s Motion for Summary Judgement to UMC's Patent Defense to Oak's Fraud Claim dated Dec. 10, 2002* (16 pgs), Certificate of Service via overnight and hand delivery re United Microelectronics Corporation's Opposition to Oak Technology, Inc.'s Motion for Summary Judgement on UMC's Patent Defense to Oak's Fraud Claim dated Dec. 13, 2002 (2 pgs).

*Oak Technology, Inc., v. United Microelectronics Corp.,* Case No. C97020959 RMW ARB (Consolidated with Case No. C97–21126), In the United States District Court, Northern District of California, San Jose Division, *Oak Technology, Inc.'s Reply in Support of Oak's Motion for Summary Judgement Against UMC's Patent Defense to Oak's Fraud Claim, Oak Technology, Inc., v. United Microelectronics Corp.,* Case No. C97020959 RMW ARB (Consolidated with Case No. C97–21126), In the United States District Court, Northern District of California, San Jose Division (15 pgs), Certificate of Service (2 pgs), dated Dec. 20, 2002.

Complaint under Section 337 of the Tariff Act of 1930, as Amended; In the Matter of *Certain Optical Disk Controller Chips and Chipsets and Products Containing Same, Including DVD Players and PC Optical Storage Devices,* United States International Trade Commission Washington, D.C., Investigation No. 337–TA–, dated Mar. 11, 2004 (35 pgs).

Public Version of Response to Complaint and Notice of Investigation Under Section 337 of the Tariff Act of 1930, as Amended, United States International Trade Commission Washington, D.C. Before the Honorable Paul J. Luckem, Administrative Law Judge, Investigation No. 337–TA–506, dated May 4, 2004 (48 pgs).

*Zoran Corporation and Oak Technology, Inc. v. Mediatek, Inc., Mintek Digital, Inc., Asustek Computer, Inc., Lite–On Information Technology Corp., Teac Corporation, Teac America, Inc., Terapin Technology PTE., LTD. Corporation and Teraoptix L.P. d/b/a Terapin Technology,* First Amended Complaint for Patent Infringement; Demand for Jury, United States District Court, Central District of California, Southern Division, Case No. SA CV 04–0313 GLT (RCx), Exhibit 1 and Exhibit 2, dated May 20, 2004, filed May 21, 2004 (114 pgs).

Public Version of Final Initial and Recommended Determinations, In the Matter of *Certain Optical Disk Controller Chips and Chipsets and Products Containing Same, Including DVD Players and PC Optical Storage Devices,* United States International Trade Commission Washington, D.C., Investigation No. 337–TA–506, dated May 16, 2005 (198 pgs).

Public Version of Petition for Review of Complainants Zoran Corporation and Oak Technology, Inc., In the Matter of *Certain Optical Disk Controller Chips and Chipsets and Products Containing Same, Including DVD Players and PC Optical Storage Devices,* United dated May 27, 2005 (50 pgs).

Public Version of Respondent's Petition for Review of Final Initial and Recommended Determinations, In the Matter of *Certain Optical Disk Controllee Chips and Chipsets and Products Containing Same, Including DVD Players and PC Optical Storage Devices,* United States International Trade Commission Washington, D.C., Investigation No. 337–TA–506, dated May 27, 2005 (206 pgs).

Public Version of Respondant's Opposition to Complainant's Petition for Review, In the Matter of *Certain Optical Disk Controller Chips and Chipsets and Products Containing Same, Including DVD Players and PC Optical Storage Devices,* United States International Trade Commission Washington, D.C., Investigation No. 337–TA–506, dated Jun. 6, 2005 (40 pgs).

Public Version of Office of Unfair Import Investigations'Response to Petitions for Review of Initial Determination, In the Matter of *Certain Optical Disk Controller Chips and Chips and Chipsets and Products Containing Same, Including DVD Players and PC Optical Storage Devices,* United States International Trade Commission Washington, D.C., Investigation No. 337–TA–506, dated Jun. 15, 2005 (53 pgs).

Public Version of Complainants Zoran Corporation and Oak Technology, Inc.'s Reply to Respondent's Petition for Review, In the Matter of *Certain Optical Disk Controller Chips and Chipsets and Products Containing Same, Including DVD Players and PC Optical Storage Devices,* United States International Trade Commission Washington, D.C., Investigation No. 337–TA–506, dated Jun. 6, 2005 (163 pgs).

*Oak Technology, Inc. v. United Microelectronics Corporation,* Case No. C 97–20959 RMW (Consolidated with C 97–21126 RMW) In the United States District Court, For the Northern District of California, San Jose Division, Order Denying UMC's Motion for Summary Judgement that the '715 Patent is Invalid Under 35 U.S.C. §112 ¶¶1, 2 & 6, filed May 5, 2005 (12 pgs).

*Zoran Corporation and Oak Technology, Inc. v. Mediatek, Inc., Asustek Computer, Inc., Lite–On Information Technology Corp., et al.,* Case No. C–04–04609 RMW In the United States District Court, For the Northern District of California, San Jose Division, First Amended Complaint for Patent Infringement dated Dec. 22, 2004 (Exhibits A–1 and B–1) (96 pgs).

*Zoran Corporation and Oak Technology, Inc. v. Mediatek Inc., Austek Computer, Inc., Lite–On Information Technology Corp., et al.,* Case No. C–04–04609 RMW In the United States District Court, For the Northern District of California, San Jose Division, Defendant's Answer to Zoran Corporation and Oak Technology, Inc. 's First Amended Complaint, E–filed Jan. 10, 2005 (14pgs).

*In the Matter of Certain Optical Disk Controller Chips and Chipsets and Products Containing Same, Including DVD Players and PC Optical Storage Devices,* Invest. No. 337–TA–506, Public Version, U.S. Int'l. Trade Commission, Washington D.C., Post Brief of Complainants Zoran Corporation and Oak Technology, Inc. dated May 7, 2005 (197 pgs).

*In the Matter of Certain Optical Disk Controller Chips and Chipsets and Products Containing Same, Including DVD Players and PC Optical Storage Devices,* Invest. No. 337–TA–506, Public Version, U.S. Int'l. Trade Commission, Washington D.C., Post Hearing Reply Brief of Complainants Zoran Corporation and Oak Technology, Inc. dated Mar. 21, 2004 (142 pgs).

Public Version, U.S. Int'l. Trade Commission, Washington D.C. In the Matter of CERTAIN OPTICAL DISK CONTROLLER DISK CONTROLLER CHIPS AND CHIPSETS AND PRODUCTS CONTAINING SAME, INCLUDING DVD PLAYERS AND PC OPTICAL STORAGE DEVICES,. "Public Version of Respondents'Post–Hearing Reply Brief", May 9, 2005, 141 pages.

Public Version, U.S. Int'l. Trade Commission, Washington D.C., In the Matter of CERTAIN OPTICAL DISK CONTROLLER CHIPS AND CHIPSETS AND PRODUCTS CONTAINING SAME, INCLUDING DVD PALYERS AND PC OPTICAL STORAGE DEVICES., "Public Version of Respondants'Post–Hearing Brief", May 9, 2005, 226 pages.

Public Version, U.S. Int'l. Trade Commission, Washington D.C., In the Matter of CERTAIN OPTICAL DISK CONTROLLER CHIPS AND CHIPSETS AND PRODUCTS CONTAINING SAME, INCLUDING DVD PLAYERS AND OPTICAL STORAGE DEVICES, "Post–Hearing Brief of the Commission Investigative Staff", Mar. 7, 2005, 84 pages.

Public Version, U.S. Int'l. Trade Commission, Washington D.C., In the Matter of CERTAIN OPTICAL DISK CONTROLLER CHIPS AND CHIPSETS AND PRODUCTS CONTAINING SAME, INCLUDING DVD PLAYERS AND PC OPTICAL STORAGE DEVICES, "Post–Hearing Reply Brief of the Commission Investigative Staff", Mar. 21, 2005, 64 pages.

"The Soaring CD_ROM Drive Market —Worldwide Shipments, " excerpts from Computer Reseller News, Jun. 24, 1991, page 101.

"Growing supply of games propels optical–drive shipments, " excerpts from Electronic Business, Jul. 1993, page 22.

"8/30 Prototype Status Update, " Product.XLS, RX–25C, (1 page).

"PS011.XLS," Sep. 2, 1993, (1 page).

"Prototype Tracking Sheet —Weekending Aug. 27, 1993, " Product #011A, Die Size 169.3 x213.1, Technology: TSMC 0.8$\mu$m Compass 470 Library, (1 page).

Working Draft, Information Technology —AT Attachment Interface with Extensions (ATA–2), X3T9.2 948D, Revision 1, Sep. 20, 1993, RX–336, 62 pages.

Berlekamp, E, "Bit–Serial Reed–Solomon Encoders, " Nov. 1982, IEEE Transactions On Information Theory, vol. 1T–28, No. 6, 0018–9448/82/1100–0869$00.875, pages 869–874.

Boulay, Paul, "SCSI-2 CD–ROM Command Set Proposal, " X3T9.2/87–210 Revision 2, Mar. 6, 1988, 1–63 pages.

"Identification of Proposed Project –SCSI Common Access Method, " Apr. 27, 1990 by ASC X3T9.2, ftp://ftp.t10.org/x3t9.2/document.90/90–057rl.txt, 1–3 pages.

"Identification of Proposed Project ATA Extensions, "dated Aug. 23, 1991 by X3T9 Technical Committee, ftp://ftp.t10.org/x3t9.2/document.91/91–104rl.txt, 1–4 pages.

Shah, S., "Proposed Changes for LBA support for ATA I/F —ATA (AT Attachment) X3T9.2/92–157r5, " dated Sep. 21, 1992, 1–9 pages.

Shah, S. "Support for Greater Than 528MB ATA Drive, " X3T9.2/92–74, dated Mar. 18, 1992, Western Digital Corporation, 1–8 pages.

Buddine, L., et al., "The Brady Guide to CD–ROM" Prentice Hall Press (1987), cover page, table of contents, pages 71–76 and 373–.

"Western Digital Enhanced IDE Implementation Guide Appendix F —Western Digitals's IDE CD–ROM Proposal Revision 1.0 " dated Oct. 7, 1993, Original version: Jun. 23, 1993, MTK–ITC–126502 –MTK–ITC–126542 (total 40 pages).

"American National Standard —Small Computer System Computer Systems interface (X3.131–198X) SCSI–2, " Technical document from website ftp://ftp.t10.org/x3t9.2/document.89/89–130rl.txt, Aug. 24, 2004. 1–113 pages.

Allan, I. Dal, "Small Form Factor Commitee Specification of ATA Packet Interface for CD–ROMs —SFF–8020, " Revision 1.2, Jun. 10, 1994, cover page, pages i–x, pages 1–186.

"Weames Ships $449 MPC–Level 2, CD–ROM Drive with $199 Wave Table Sound Card, " Aug. 2, 1993; PR Newswire Association, Inc., 377th Story of Level 1 printed in FULL Format, Lexis–Nexis, page 21–22.

"Information on a silver platter; CD–ROM drives, " Feb. 1993; Computer Shopper Guide; vol. 13; No. 2; p. 374; ISSN: 0886–0556, pages 14–18.

Quain, John R., "CD–ROM Gaining Momentum, CD–ROM drives; The Perfect PC; Cover Story, " Jul. 1993, 381st Story of Level 1 printed in FULL Format, PC Magazine, Ziff-–Davis Publishing Company, Copyright 1993, pages 19–20.

Li, Sing, "Writing non–SCSI CD–ROM Device Drives; Small Computer System Interface, " 359th Story of Level 1 printed in FULL Format, Mar. 1994, M&T Publishing Inc., Copyright 1994, pages 29–48.

E–mail from Tom Hanan to X3T9.2 Committee (SCSI), "SFF Local Bus Meeting Minutes, " X3T9.2/93–022 rev 0, Jan. 28, 1993, pages 1–3.

Memoradum from M. Furuta to D. Tsang and K. Fujimoto re OTI–011 vol. Purchase Agreement and Mitsumi IDE with attached Certified Japanese Translation, pp. 1–10, Jul. 27, 1993.

OTI–011 IDE CD–ROM Controller Engineering Specification, Rev. 2.0. pp. 1–50, dated Oct. 25, 1993.

Handwritten document titled, "OT1012 OT1011/New"; 1 pg., dated Feb. 24, 1993.

Philip Verinsky/Oak Technology Comp Book/Notebook, 12 pgs., dated May 26, 1993, May 27, 1993 May 28, 1993, May 29, 1993, Jun. 14, 1993, Jul. 7–Aug. 1993, and Jul. 29, 1993.

Memoradum from W. Wang to N. Sugle, P. Verinsky, L. Ebisu, J. Ito, A. Tanaka and Kato to N. Sugie re Preliminary report on IDE, 2 pgs., dated Sep. 5, 1992.

Mitsumi Sales Call Report , 1 pg., Apr. 14, 1993.

Memoradum from W. Wang to P. Verinsky, L. Ebisu, J. Ito and N. Sugie re Weekly Status Report, 1 pg., dated Oct. 2, 1992.

Memoradum from T. Makino to D. Tsang , P. Brown and P. Verinsky re Visit to Company, 3 pgs., dated Jul. 5, 1993.

E–mail Thread dated Oct. 6, 1993 from P. Brown to tomel@microsoft.com re Microsoft PDC announcement, 32 pgs.

E–mail thread dated Aug. 13, 1993 from P. Verinsky to H. Shinohara et al. re More Answers to Register Questions, 117 pgs.

String of emails from N. Sugie to P. Verinsky, 80 pgs., dated Aug. 26, 1993.

Memoradum from P. Brown to D. Bryson re Barrier Plan, 2 pgs., dated Apr. 20, 1994.

Document titled, "Small Form Commitee Specification for ATA Timing Extensions for local Bus Attachment Rev 1.1, " dated Sep. 18, 1993, 17 pgs.

Technical document titled, "ATAPI CD–ROM Specification AT Attachment Packet Interface, CD–ROM Devices Revision A1.6, " dated Sep. 10, 1993, 174 pgs.

Techncial document titled, "ATAPI CD–ROM Specification AT Attachment Packet Interface, CD–ROM Devices Revision A1.7" dated Oct. 18, 1993 by Western Digital, 176 pgs.

"ATAPI CD–ROM Specification Preliminary Draft AT Attechment Packet Interface CD–ROM Devices Revision A1.7B, " technical document dated Nov. 2, 1993 by Western Digital .

"OTI–011A," Various schematics.

"Working draft Information technology —AT attachment Interface with Extensions (ATA–2) X3T9.2 948 D Revision 0,"technical document dated Sep. 1, 1993.

"Minute for Device Driver Development," with Memorandum re Oak Technology and NEC Home Electronics"exclusive arrangement on May 26, 1993" signed by D.D. Tsang (May 27, 1993) and M. Kaneko (May 28, 1993); also attached is document in Japanese with attached certified Japanese translation.

"HMISC —UMISC Register," Schematic, (1 pg.)

"HMSCR —UMISC Read Register," Schematic, (1 pg.)

"HICTL Register, " Schematic, (1 pg.).

Handwritten notes "Old OTI011 and new OTI011" (with ATAPI Support).

ATAPI CD–ROM Standard, Revision A1:6, changes between A1.5 and A1.6, Sep. 10, 1993.

"CD–ROM to IEA BUSI/F, 16–BIT DMA, " Schematic, (1 pg.).

"CD–ROM to ISA Bus I/F, 8–Bit FIA/DMA, " Schematic, (1pg.).

"CD–ROM Drive, Enhances Mode (Preliminary)," Schematic, (1 pg.).

"IDE Bus Transaction Types,".

Hand drawn schematic (1 pg.).

Handwritten notes "May 20, 1993 at home," (1 pg.).

Memoradum dated Sep. 5, 1993 from Phil Verinsky to Mr. Utsumi and Mr. Shinohara at NEC Home Electronics, (2 pgs.).

Letter to Nagai from Verinsky re OTI–011, Jul. 30, 1993, (1 pgs.).

Cole, Bernard C., "IDE ATA Disk Interface Hits the Wall, " Electronic Engineering Times, May 3, 1993, p. 45 (pages 1–4), ISSN: 0192–1541.

Draft Proposed American National Standard –ATA (AT Attachment), Prepared by X3T9 I/O Interface Accredited Standards Committee X3–Information Processing Systems. Working Draft —"AT Attachment Interface for Disk Drives, " X3T10791D, Revision 4c, Copyright 1994, pages 1–45.

Exhibit 7 (from Exhibit 13) to Rebuttal Expert Report of Allen Samuels on Invalidity and Supplemental Expert Report on Infringement: E:\OT1011A\INET011A\VTI.LOG.

Exhibit 13 to Rebuttal Expert Report of Allen Samuels on Invalidity and Supplemental Expert Report on Infringement: OTI–011AB Microcontroller Registers.

Exhibit 44 to Rebuttal Expert Report of Allen Samuels on Invalidity and Supplemental Expert Report on Infringement: "CD–Rom Supply Chain Tries to Keep Momentum Going," Electronic Business Buyer, page 1–2, Jun. 1995.

Exhibit D to Exhibit 14 to Amended Complaint: Declaration of Allen Samuels in Support of Infringement and Domestic Industry of U.S. Appl. No. 6,584,527 and 6,546,440: ATAPI Specification ATA Packet Interface for CD–ROMS Rev. 2.6 Jan. 22, 1996, 208 pages.

Press Release: "Oak Technology Introduces Fourth Generation IDE/CD–ROM Controller —OTI–910 Extends Oak's leadership Position in IDE CD–ROM Technology, " Aug. 7, 1995.

Press Release: "Oak Technology Debuts Next–Generation Multimedia Controller for IDE CD–ROM Drives —Integrates Advanced Design Features for Multimedia Applications, " Dec. 5, 1994.

OTI–011 Task List, Jan. 21, 1993, pages 1–5.

Memoradum from Phil Verinsky to Mr. H. Shinohara, NEC Home Electronics re: OTI–011 Status on Sep. 5, 1993, 1 page.

IDE/HOST Checklist dated Jun. 7, 1993, 1–2 pages.

Memoradum from Phil Verinsky to H. Shinohara @NEC Home Electronics re: OTI–011 Status, Sep. 1, 1993, 1 page.

Memoradum from Phil Verinsky to H. Shinohara at NEC Home Electronics, re: OTI–011 Current Status, Sep. 9, 1993, 1 page.

OTI–011 Register Changes authored by Don Smith, 1 page.

OTI–011 IDE Interface Control Registers (from the microcontroller's perspective), 2 pages.

International Standard, "Compact Disc Digital Audio System" (Red Book), CEI IEC 908, First Edition, 1987, 66 pages.

Exhibit 1 to Response to Complaint: "ATAPI CD–ROM Standard: Proposal for Working Draft, " RX–84C from CD ROM CONTROLLERS II, Jun. 10, 1993, Western Digital, 130 pages.

"OTI–011 Microcontroller Registers," RX–16C form CD ROM CONTROLLERS II, Apr. 21, 1993, 5 pages.

"Drafts Proposed American National Standard"—ATA (AT Attachment), Prepared by X3T9–I/O Interface Accredited Standards Committee —X3, X3.221–199x RX–31C from CD ROM CONTROLLERS II, Feb. 10, 1992, 56 pages.

IDE/Host Checklist RX–17C from CD ROM CONTROLLERS II, Revised Monday, Jun. 7, 1993 at 11:35:46 AM, 2 pages.

"Schematics re Host RX–134C" from CD ROM CONTROLLERS II, Apr. 14, 1997, 23 pages.

Schematics re Host by phil on Nov. 13, 1998 at 6:37 PM, 15 pages.

"OTI–011AB Microcontroller Registers," May 23, 1993, 7 pages.

Sanyo Application Note No. E89 entitled "Sanyo LC8950 & LC8951 Real–Time Error Correction and Host Interface Processors for CD–I and CD–ROM Applications, " RX–4C from CD ROM CONTROLLERS II, Jun. 1989, 125 pages.

Section from ATAPI CD–ROM Standard –Proposal for a Working Draft, Version A1.3, Jun. 10, 1993, 10 pages.

Oak employee Don Smith's design notes describing the OTI–011 registers, including the direct access feature for PDIAG, DASPEN and clear BSY signals, RX–20C from CD ROM CONTROLLERS II, 1 page.

Handwritten drawing: "Execute Drive Diagnostic, " RX–23 from CD ROM CONTROLLERS II, Apr. 21, 1993, 1 page.

"ATAPI CD–ROM Specification A1.4 –Obsolete –AT Attachment Packet Interface, CD–ROM Devices, " Aug. 17, 1993, 144 pages.

Status Report from Phil Verinsky RX–48C from CD ROM CONTROLLERS II, Feb. 26, 1993, 2 pages.

Memo from kenji Fujimoto to David Tsang, OTI–012 and the license of OTI–011, Apr. 23, 1993, 2 pages.

Phil Verinsky's inventor notebook, RX–27C from CD ROM CONTROLLERS II, 41 pages.

"ATAPI CD–ROM Specification A1.4 –Obsolete –AT Attachment Packet Interface, CD–ROM Devices, " Aug. 17, 1993, 144 pages.

"0ATAPI CD–ROM Specification –AT Attachment Packet Interface, " CD–ROM Devices RX–344C from CD ROM CONTROLLERS, Sep. 19, 1993, 179 pages.

"IDE CD–ROM Controller –OTI–011 Preliminary Specification RX–268C" from CD ROM CONTROLLERS II, Feb. 4, 1994, 100 pages.

Western Digital Generated Proposal for a Working Draft: "ATAPI CD–ROM Specification, " Revision A1.7 RX–343C from CD ROM CONTROLLERS II, Oct. 18, 1993, 178 pages.

Wilson, Ron, "CD–ROM Chips Raise Speed Ante, " EET, Aug. 14, 1995. 1 page.

Small From Factor Committee Specification of "ATA Packet Interface for CD–ROMs SFF–8020, " Rev. 1.2, Feb. 24, 1994, 197 pages.

Fricks, James R., "Compact Disc Terminology" 1992, Disc Manufacturing, Inc. 1–26 pages.

"ATAPI CD–ROM Standard Revision A1:4, changes between A1.3 & A1, " Working document & General Proposal, Aug. 17, 1993 by Western Digital, 144 pages.

"ATAPI CD–ROM Standard Revision A1:5, changes between A1.4 &A1.5, " dated Aug. 28, 1993 by Western Digital (with marginlia), 89 pages.

Western Digital Generated Proposal for a Working Draft: "ATAPI CD–ROM Specification AT Attachment Packet Interface, CD–ROM Devices, " Revision A1.5, dated Aug. 28, 1993 by Western Digital, 158 pages.

Changes between A. 13 and A.14, "Preliminary Draft ATAPI CD–ROM Specification Revision A1.4, " dated Aug. 17, 1993 by Western Digital, 75 pages.

OTI —011A schematics (Zoran/Oak Tech) by Phil on Nov. 13, 1998, 348 pages.

IDE interface control registers—RX–22C from CD ROM CONTROLLERS II, 1 page.

Email from Weigung Wang to Noboru Sugie re: Weekly Status Report Sep. 18, 1992, RX–100C from CD ROM CONTOLLERS II, 1 page.

OTI–011AB Microcontroller Registers, May 23, 1993 register map, 7 pages.

Schematic HPIMF—Host Pin Functionally Changes, 1 page.

Exhibit 9 to Rebuttal Expert Report of Allen Samuels on Invalidity and Supplemental Expert Report on Infringement, 7 pages.

Exhibit 10 to Rebuttal Expert Report of Allen Samuels on Invalidity and Supplemental Expert Report on Infringement: Module tree for Host Interface Modules of OTI–011A, 2 pages.

Exhibit 11 to Rebuttal Expert Report of Allen Samuels on Invalidity and Supplemental Expert Report on Infringement: Schematic diagram for OTI–011A dated Jul. 18, 1993, 1 page.

Exhibit 12 to Rebuttal Expert Report of Allen Samuels on Invalidity and Supplemental Expert Report on Infringement: Changes SC.TXT Schematic\Netlist Changes, 2 pages.

Exhibit 14 to Rebuttal Expert Report of Allen Samuels on Invalidity and Supplemental Expert Report on Infringement: OTI–011AB Microcontroller Registers , 8 pages.

Draft Agreement between Oak and NEC Home Electronics Co. Ltd. Optical Media Products Divisions, Oct. 1993, 4 pages.

OTI–011AB Microcontroller Registers—Prelimainary Jul. 20, 1993, 9 pages.

OTI–011AB Microcontroller Registers —Preliminary Jul. 18, 1993, 15 pages.

PowerPoint Presentation: Oak Technology, Inc. Multimedia Solutions in Silicon: Background and Overview of OTI–011, Mar. 94, 33 pages.

PowerPoint Presentation: Oak Technology, Inc. Multimedia Solutions in Silicon: Multimedia PC Market Trends, May 2, 1994, 27 pages.

PowerPoint Presentation: Oak Technology, Inc. Multimedia Solutions in Silicon CD–ROM, Apr. 12, 1994, 35 pages.

Memorandum from NEC to Oak Technology on Jul. 5, 1993 regarding NEC visit to Oak, Jul. 5, 1993, 3 pages.

Memoradum from Kenji Fujimoto to Peter Brown re: Mitsumi and OTI–011 and OTI–012 on Jul. 13, 1993, 1 page.

Memorandum from Kenji Fujimoto to Peter Brown re: Mitsumi and OTI–011 and OTI–012 on Aug. 18, 1993, RX–453C from CD ROM CONTROLLERS II, 4 pages.

Fax communication from Peter Brown to Junji Tanaka, Tomoka Etoh on Sep. 30, 1993 regarding shipping OTI–0111, 1 page.

Fax communication from Tomoka Etoh to Peter Brown on Oct. 4, 1993 regarding shipping OTI–011 Price for Mitsumi, 4 pages.

Memorandum from Kenji Fujimoto to David Tsang on Oct. 20, 1993 regarding NEC Home Electronics Business, RX–105C from CD ROM CONTROLLERS II, 4 pages.

Memorandum from Kenji Fujimoto to Peter Brown on Nov. 24, 1992 re: IDE–CD ROM controller, 1 page.

Memorandum from Peter Brown to Scott Alberta on Nov. 22, 1993 regarding Product Release Plan, 3 pages.

Memorandum from Phil Verinsky to NEC Home Electronics regarding EXECUTE DIAGNOSTIC Command, 2 pages.

Memorandum from Phil Verinsky to NEC Home Electronics re: OTI–011 Status on Sep. 7, 1993, 1 page.

Memorandum from Phil Verinsky to NEC Home Electronics re: OTI–011 Status on Sep. 8, 1993, 1 page.

Memorandum from Phil Verinsky to NEC Home Electronics re: OTI–011 Status Update, Sep. 12, 1993, 1 page.

Memorandum from Phil Verinsky to NEC Home Electronics re: OTI–011 Status Update, Sep. 13, 1993, 1 page.

Pins Needed for IDE–bus interface in the OTI–011, 2 pages.

Memorandum from A. Tanaka to Phil Verinsky re: IDE Prototype Summary, Feb. 19, 1993, 5 pages.

Memo from A. Tanaka to Phil Verinsky re: IDE Prototype Summary [DEPO EXHIBIT 518 (Case)], RX–47C from CD ROM CONTROLLERS II, Feb. 1993, 4 pages.

IDE Interface Diagrams from Mitsumi, RX–30C from CD ROM CONTROLLERS II, 15 pages.

Memo of Oct. 9, 1992 from Weigung Wang to Neboru Sugie (cc:Phil Verinsky) re: Weekly Status Report RX–35C from CD ROM CONTROLLERS II, 1 page.

Memo of Oct. 16, 1992 from Weigung Wang to Neboru Sugie (cc: Phil Verinsky) re: Weekly Status Report RX–36C from CD ROM CONTROLLERS II, 1 page.

Oct. 23, 1992 from Weigung Wang to Neboru Sugie (cc: Phil Verinsky) RX–415C from CD ROM CONTROLLERS II, 1 page.

Host IDE REG CONTROL schematics printed on Apr. 30, 1993; CPX–51C oversize of 1003DOC00006, 2 pages.

ATAPI CD–ROM Standard and Verinsky Handwritten Notes dated Jun. 13, 1993, 10 pages.

OTI–011 IDE CD–ROM Controller –Engineering Specification, Revision 1.1 (1003DOC00625–1003DOC00644) (Depo Exhibit 508 of Case Deposition on Sep. 16, 2004), 20 pages.

Schematics re IDE and DRV RX–30C from CD ROM CONTROLLERS II, 15 pages.

Oak Preliminary Specification, OTI–012 CD–ROM COntroller Chip RX–10C from CD ROM CONTROLLERS II, 79 pages.

Architectural Outline for the OTI–011 CPX–167C from CD ROM CONTROLLERS II, 1 page.

Small Form Factor Committee Specification of ATA Packet Interface for CD–ROMs SFF–8020, Revision 1.2 (aka ATAPI Specification), 196 pages.

handwritten drawing: Software Reset RX–24C from CD ROM CONTROLLERS II, 1 page.

Schematics: Host, 7 pages.

Oak Tech. –OTI–012 Overview RX–3C from CD ROM CONTROLLERS II, 10 pages.

OTI–011 IDE CD–ROM Controller –Engineering Specification, Revision 1.1 RX–12C from CD ROM CONTROLLERS II, 20 pages.

Fax from Peter Brown to Kenji Fujimoto re IDE CD–ROM Presentation (entitled OTI–011 Product features), 6 pages.

Memo from Kenji Fujimoto to Peter Brown re IDE–CD ROM Controller RX–43C from CD ROM CONTROLLERS II, 1 page.

Fax from Tan Thye Seng/Wearnes Peripherals to Phil Verinsky re Schematic and Other Issues, 1 page.

Memo from Weigung Wang to Noboru Sugie re Weekly Status Report Jun. 26, 1992 RX–28C from CD ROM CONTROLLERS II, 1 page.

Daughter board schematics RX–374C from CD ROM CONTROLLERS II, 10 pages.

Memo from Weigung Wang to Noboru Sugie RX–32C from CD ROM CONTROLLERS II, 1 page.

Memo from Weigung Wang to Noboru Sugie RX–37C from CD ROM CONTROLLERS II, 1 page.

Memorandum from W. Wang to N. Sugie, P. Verinsky, L. Ebisu, J. Ito, A. Tanaka and Kato to N. Sugie Sep. 5, 1992, 2 pages.

Handwritten document titled, "IDE Interface Issues" RX–19C from CD ROM CONTROLLERS II, 1 page.

Technical document titled, "Oak Technology OTI–011AB Microcontroller Registers, " dated Oct. 1, 1993 RX–267C from CD ROM CONTROLLERS II, 16 pages.

Document titled, "OTI–11 IDE CD–ROM Controller Preliminary Engineering Specification, " dated Feb. 4, 1994 by Oak Technology, 100 pages.

Memorandum from K. Suzuki at NEC to P. Verinsky, P. Brown, D. Tsang, K. Fujimoto, Eto, R. Hayatsu, T. Makino, Y. Utsumi, H. Hasunuma, K. Yasui, S. Tsuruhara and H. Shinohara re: OTI–011 Meeting RX–137C from CD ROM CONTROLLERS II, 1 page.

IDE2 PCB, Mitsumi Rev. A by A. Tanaka, 1 page.

Handwritten schematics titled, "Execute Drive Diagnostic, " "Write to Command Register, " and Software Reset, 4 pages.

Document titled "Misc Spec Review and Discussions with Phil V. about OTI–011", 1 page.

Notebook by Smith with "Oak Tech HDC" on cover dated Jun. 22, 1992, 34 pages.

Document titled "IDE/Host Checklist Apr. 20, 1993", 1 page.

Oak CD–ROM Product Plan, 5 pages.

Handwritten Notes re: OTI–011 Reset, 1 page.

Handwritten schematics titled, "Excute Drive Diagnostics, " "Write to Command Register," and Software Reset, 3 pages.

Handwritten schematic, 1 page.

Handwritten notes titled "DRAM Mode" 2 pages.

Memorandum from Phil Verinsky to NEC Home Electronics re: OTI–011 Development status, 1 page.

Sanyo Application Note No. E89 entitled Sanyo LC8950 & LC8951 Real–Time Error Correction and Host Interface Processors for CD–I and CD–ROM Applications RX–4C from CD ROM CONTROLLERS II Also ZC 001273–ZC 001396 (prosecution history), 125 pages.

OTI–011AA Microcontroller Registers Formally CX–124C (broken out), 5 pages.

Technical doucument titled, "ATAPI CD–ROM Specification AT Attachment Packet Interface, CD–ROM Devices Revision A1.5, " dated Aug. 28, 1993 by Western Digital, 161 pages.

Technical document titled, "ATAPI CD–ROM Specification AT Attachment Packet Interface, CD–ROM Devices Revision A1.4, " dated Aug. 17, 1993 by Western Digital, 141 pages.

International Standard, ISO/IEC 10149, International Technology–Data interchange on read–only 120 mm optical data disks (CD–ROM) Yellow Book , 45 pages.

Oaks Bids for MultiMedia Role, in Electronic News, Apr. 4, 1994, p. 24, 1 page.

Oaks Rolls High Speed CD–ROM Controller, in Electronic News, Aug. 14, 1995, 1 page.

Notes, Mitsumi Meeting Jul. 9, 1992 at Oak U.S.A. RX–29C from CD ROM CONTROLLERS II, 5 pages.

Document titled "IDE/Host Checklist Apr. 13, 1993" , 1 page.

Document titled "New Select Inhibit List" dated Apr. 25, 1993, 3 pages.

Michael Case Notebook, 12 pages.

* cited by examiner

| Pin# | Pin Name | Type | Comments | Pin# | Pin Name | Type | Comments |
|---|---|---|---|---|---|---|---|
| 1 | VSSE | P | | 29 | UD6 | B | uCOM Data Bus |
| 2 | RAD3 | O | RAM Address Bus | 30 | VSSE | P | |
| 3 | RAD11 | O | | 31 | UD7 | B | uCOM Data Bus |
| 4 | RAD12 | O | | 32 | URS | I | uCOM Register Select |
| 5 | RAD13 | O | | 33 | URD- | I | uCOM Read Strobe |
| 6 | RAD15 | O | | 34 | UWR- | I | uCOM Write Strobe |
| 7 | VSSE | P | | 35 | UCS- | I | uCOM Chip Select |
| 8 | DLRCK | I | 44.1KHz L/R Strobe | 36 | UINT- | O | uCOM Interrupt |
| 9 | DSDATA | I | Serial Data | 37 | HDASP- | B | IDE Host Interface |
| 10 | DBCK | I | Serial Bit Clock | 38 | CS3FX | I | |
| 11 | DC2PO | I | C2 Pointer Input | 39 | CS1FX | I | |
| 12 | RDPAR | B | RAM Parity Data | 40 | HA2 | I | |
| 13 | MCK | O | | 41 | VDD | P | |
| 14 | XOUT | O | X'tal OSC Output | 42 | HA0 | I | IDE Host Interface |
| 15 | XIN | I | X'tal OSC Input | 43 | HPDIAG- | B | |
| 16 | VSSI | P | | 44 | HA1 | I | |
| 17 | SBSO | I | Subcode Interface | 45 | IOCS16- | O | |
| 18 | WFCK | I | | 46 | VSSE | P | |
| 19 | SUB | I | | 47 | HIRQ | O | IDE Host Interface |
| 20 | EXCK | B | | 48 | DMACK- | I | |
| 21 | VDD | P | | 49 | IORDY | O | |
| 22 | UD0 | B | uCOM Data Bus | 50 | HRD- | I | |
| 23 | UD1 | B | | 51 | VSSE | P | |
| 24 | VSSE | P | | 52 | HWR- | I | IDE Host Interface |
| 25 | UD2 | B | uCOM Data Bus | 53 | HDRQ | O | |
| 26 | UD3 | B | | 54 | HD15 | B | |
| 27 | UD4 | B | | 55 | HD0 | B | IDE Host Data Bus |
| 28 | UD5 | B | | 56 | HD14 | B | |

FIG. 3b

| Pin# | Pin Name | Type | Comments | Pin# | Pin Name | Type | Comments |
|---|---|---|---|---|---|---|---|
| 57 | HD1 | B | IDE Host Data Bus | 79 | RD6 | B | RAM Data Bus |
| 58 | VSSE | P | | 80 | VSSE | P | |
| 59 | HD13 | B | IDE Host Data Bus | 81 | RD3 | B | RAM Data Bus |
| 60 | CLKSTP | I | | 82 | RD2 | B | |
| 61 | HD2 | B | IDE Host Data Bus | 83 | RAD10 | O | RAM Address Bus |
| 62 | HD12 | B | | 84 | ROE- | B | RAM Read Enable |
| 63 | HD3 | B | | 85 | RD0 | B | RAM Data Bus |
| 64 | VSSI | P | | 86 | VSSE | P | |
| 65 | HD11 | B | IDE Host Data Bus | 87 | RD1 | B | RAM Data Bus |
| 66 | VSSE | P | | 88 | RWE- | O | RAM Write Enable |
| 67 | HD4 | B | IDE Host Data Bus | 89 | VDD | P | |
| 68 | HD10 | B | | 90 | RAD14 | O | RAM Address Bus |
| 69 | HD5 | B | | 91 | RAD9 | O | |
| 70 | HD9 | B | | 92 | RAD8 | O | |
| 71 | HD6 | B | | 93 | RAD7 | O | |
| 72 | VSSE | P | | 94 | VSSE | P | |
| 73 | HD8 | B | IDE Host Data Bus | 95 | RAD6 | O | RAM Address Bus |
| 74 | HD7 | B | | 96 | RAD5 | O | |
| 75 | RESET- | I | | 97 | RAD4 | O | |
| 76 | RD4 | B | RAM Data Bus | 98 | RAD0 | O | |
| 77 | RD5 | B | | 99 | RAD1 | O | |
| 78 | RD7 | B | | 100 | RAD2 | O | |

FIG. 3c

| Pin Name | Pin Type | Pin Description |
|---|---|---|
| UD7-UD0 | I/O | uCONTROLLER DATA BUS - Microcontroller bidirectional data bus. This bus is compatible with most microcontrollers. |
| URS- | IN | uCONTROLLER REGISTER SELECT - Register select input. AR (address register) is selected if URS=0. Otherwise, microcontroller will access the internal register that is pointed by the AR register. |
| URD- | IN | uCONTROLLER READ STROBE - Microcontroller read strobe. |
| UWR- | IN | uCONTROLLER WRITE STROBE - Microcontroller write strobe. |
| UCS- | IN | uCONTROLLER CHIP SELECT - Microcontroller chip select input. |
| UINT- | OUT/ Open-Drain | uCONTROLLER INTERRUPT - Microcontroller interrupt output. This is an open-drain ouput. This signal can be externally wired-OR with other interrupt sources. |

FIG. 4

| Pin Name | Pin Type | Pin Description |
|---|---|---|
| HD15 - HD0 | I/O | HOST DATA BUS - Host Bidirectional Data Bus. |
| HWR- | IN | HOST WRITE STROBE - Host IO write strobe. |
| HRD- | IN | HOST READ STROBE - Host IO read strobe. |
| HA2-HA0 | IN | HOST ADDRESS - These are the 3-bit Host Addresses asserted by the host to access a register or data port in the OTI-011. |
| IOCS16- | OUT/ Open-Drain | DRIVE 16-bits I/O - For PIO transfer, IOCS16- indicates to the host system that the 16-bit data port has been addressed and OTI-011 is prepared to send or receive 16-bit data word. |
| CS1FX- | IN | HOST CHIP SELECT 1 - This is the chip select signal decoded from the host address bus used to select the Command Block registers in the OTI-011. |
| CS3FX- | IN | HOST CHIP SELECT 3 - This is the chip select signal decoded from the host address bus used to select the Control Block registers in the OTI-011. |
| HDRQ | OUT | HOST DMA REQUEST - This signal will be asserted for DMA data transfer when OTI-011 is ready to transfer data to or from the host. This signal is used in a handshake manner with DMACK-. When a DMA operation is enabled, data transfers are 16-bits wide. |
| DMACK- | IN | HOST DMA ACKNOWLEDGE - This signal is used by the host in response to HDRQ. |
| HIRQ | OUT | HOST INTERRUPT - This signal is used to interrupt the host system. |
| IORDY | OUT | HOST IO READY - This signal is asserted to extend the host transfer cycle of any host read access when the OTI-011 is not ready to respond to a request. |
| HDASP- | I/O | HOST DRIVE ACTIVE/DRIVE 1 PRESENT - This is a time-multiplexed signal which indicates that a drive is active, or that Drive 1 is present. This signal is controlled by the firmware. |
| HPDIAG- | I/O | HOST PASSED DIAGNOSTICS - This signal is asserted by Drive 1 to indicate to Drive 0 that it has completed diagnostics. This signal is controlled by the firmware. |

FIG. 5a

|  | Addresses |  |  |  | Functions | |
|---|---|---|---|---|---|---|
| CS1FX- | CS3FX- | DA2 | DA1 | DA0 | Read (DIOR-) | Write (DIOW-) |
|  |  |  |  |  | Control block registers | |
| N | N | x | x | x | Data bus high impedance | Not Used |
| N | A | 1 | 1 | 0 | Alternate ATAPI status | Device control |
| N | A | 1 | 1 | 1 | Drive Address | Not Used |
|  |  |  |  |  | Command block registers | |
| A | N | 0 | 0 | 0 | Data | Data |
| A | N | 0 | 0 | 1 | ATAPI Error Register | ADAPI Features |
| A | N | 0 | 1 | 0 | ATAPI Interrupt Reason Register (R/W) | |
| A | N | 0 | 1 | 1 | Not Used | Not Used |
| A | N | 1 | 0 | 0 | ATAPI Byte Count Register (bit 7-0) (R/W) | |
| A | N | 1 | 0 | 1 | ATAPI Byte Count Register (bit 15-8) (R/W) | |
| A | N | 1 | 1 | 0 | Drive Select (R/W) | |
| A | N | 1 | 1 | 1 | ATAPI Status | ATA Command |
| A | A | x | x | x | Invalid address | Invalid Address |

Logic conventions are: A = signal asserted, N = signal negated

FIG. 5b

| Pin Name | Pin Type | Pin Description |
|---|---|---|
| DSDATA | IN | DSP SERIAL DATA - This serial input receives the data from DSP (CIRC decoder). The DBCK pin provides the data clock to the OTI-011. The received data are stored in the buffer RAM. |
| DBCK | IN | DSP BIT CLOCK - This clock input receives bit clock from DSP. |
| DLRCK | IN | DSP L/R CLOCK - Supplies the signal which is used to distinguish L-channel/R-channel (44.1KHz) DLRCK signal also indicates the start timing of 16 bit PCM word. |
| DC2PO | IN | DSP C2 POINTER - Supplies C2 error flag signal from DSP. When high, DC2PO indicates an error condition. |

FIG. 6

| Pin Name | Pin Type | Pin Description |
|---|---|---|
| SBSO | IN | SUBCODE SERIAL DATA - Supplies Subcode serial data. The subcode words (P-W) will be stored into buffer RAM in the order. |
| SUB | IN | SUBCODE SYNC - Supplies Subcodes SYNC from DSP. |
| EXCK | I/O | EXTERNAL CLOCK - Supplies Bit Clock for Subcode interface. This pin can be programmed as input or output. |
| WFCK | IN | WRITE FRAME CLOCK - Supplies Write Frame Clock from DSP. (7.35KHz) |

FIG. 7

| Pin Name | Pin Type | Pin Description |
|---|---|---|
| RAD15-RAD0 | OUT | RAM ADDRESS BUS - Buffer RAM address outputs. |
| RDPAR | I/O | RAM PARITY DATA - RAM Parity bit when RPEN = 1. |
| RD7 - RD0 | I/O | RAM DATA BUS - Buffer RAM data bus. |
| RWE- | OUT | RAM WRITE ENABLE - The OTI-011 forces this pin low when writing data to the RAM. |
| ROE- | OUT | RAM OUTPUT ENABLE - The OTI-011 forces this pin low when reading data from the RAM. |

FIG. 8a

| Pin Name | Pin Function | Note |
|---|---|---|
| RA0 - RA8 | DRAM address | |
| RA9 | | Left Open (see note) |
| RA10 | CAS- | |
| RA11 - RA13 | | Left Open (see note) |
| RA14 | RAS- | |
| RA15 | | Left Open (see note) |

FIG. 8b

Miscellaneous Pins

| Pin Name | Pin Type | Pin Description |
|---|---|---|
| XIN<br>XOUT | IN<br>OUT | XTAL INPUT/XTAL OUTPUT - XIN, XOUT are normally connected to a crystal. (up to 21MHz) XIN pin may be driven by the external signal. (21 MHz max. 45-55% duty) The OTI-011 contains an internal resister between XIN and XOUT, so that an external resister shall not be connected to these pins. |
| MCK | OUT | M CLOCK - This output supplies clock signal of one-half the crystal frequency when register bit MCK1 is low. When register bit MCK1 is high, MCK pin supplies crystal frequency. |
| CLKSTP | IN | CLOCK STOP - CLKSTP stops the internal clock, when it is high. |
| RESET- | IN | RESET - Forcing this input low reset the OTI-011. OTI-011 can be reset by either this reset signal or the internal reset command (Writing RESET register). RSSTAT register shows user which reset most recently took place. |
| VDD | | Supplies 5.0V+/- 5% |
| VSSE/VSSI | | Ground Pins |

FIG. 9

| AR - Address Register | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| - | R | address | | | | | | | |
| - | W | address | | | | | | | |

FIG. 10

| COMIN - Command Packet Register | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 00h | R | binary | | | | | | | |
| 00h | W | unused | | | | | | | |

FIG. 11

| IFSTAT/IFCTRL - Interface Status Register/Interface Control Register ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 01h | R | cmdib | dteib | decib | X | dtbsyb | X | dtenb | X |
| 01h | W | cmdien | deteien | decien | 0 | 0 | 0 | douten | 0 |

FIG. 12

| DBCL - Data Byte/Word Counter ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 02h | R | b7 | b6 | b5 | b4 | b3 | b2 | b1 | b0 |
| 02h | W | b7 | b6 | b5 | b4 | b3 | b2 | b1 | b0 |

FIG. 13

| DBCH - Data Byte/Word Counter ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 03h | R | dtei | dtei | dtei | dtei | b11 | b10 | b9 | b8 |
| 03h | W | 0 | 0 | 0 | 0 | b11 | b10 | b9 | b8 |

FIG. 14

| HEAD0/DACL - Header Register 0/Data Address Counter ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 04h | R | header minutes (bcd) |||||||||
| 04h | W | a7 | a6 | a5 | a4 | a3 | a2 | a1 | a0 |

FIG. 15

| HEAD1/DACL - Header Registers/Data Address Counter ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 05h | R | header seconds (bcd) |||||||||
| 05h | W | a15 | a14 | a13 | a12 | a11 | a10 | a9 | a8 |

FIG. 16

| HEAD2/DTTRG - Header Registers/Data Transfer Trigger | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 06h | R | header frames (bcd) | | | | | | | |
| 06h | W | (data unused) | | | | | | | |

FIG. 17

| HEAD3/DTACK - Header Registers/Data Transfer Acknowledge | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 07h | R | header mode (bcd) | | | | | | | |
| 07h | W | (data unused) | | | | | | | |

FIG. 18

| STARTING POINT | MODE 1 (MODRQ=0) | MODE 2 (MODRQ=1) |
|---|---|---|
| First Sync Byte | FF,F0h | FF,E8h |
| First Header Byte | FF,FCh | FF,F4h |
| First Subheader Byte | - | FF,F8h |
| First User Data Byte | 00,00h | 00,00h |

FIG. 19

| PTL/WAL - ECC Block Pointer/Write Address Counter | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 08h | R | a7 | a6 | a5 | a4 | a3 | a2 | a1 | 0 |
| 08h | W | a7 | a6 | a5 | a4 | a3 | a2 | a1 | a0 |

FIG. 20

| PTH/WAH - ECC Block Pointer/Write Address Counter | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 09h | R | a15 | a14 | a13 | a12 | a11 | a10 | a9 | a8 |
| 09h | W | a15 | a14 | a13 | a12 | a11 | a10 | a9 | a8 |

FIG. 21

| WAL/CTRL0 - Write Address Counter/Control 0 Register ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 0Ah | R | a7 | a6 | a5 | a4 | a3 | a2 | a1 | 0 |
| 0Ah | W | decen | 0 | e01rq | autorq | 0 | wrrq | qrq | prq |

FIG. 22

| DECEN 0Ah.7 | WRRQ 0Ah.2 | E01RQ 0Ah.5 | QRQ 0Ah.1 | PRQ 0Ah.0 | DECODER OPERATION | CRCOK (0Ch.7) | HEAD0-3, SUBH0-3 (04-07h,14-17TH) |
|---|---|---|---|---|---|---|---|
| 1 | 1 | 1 | 1 | 1 | Q-P-correction | Valid | Buffer RAM |
| 1 | 1 | 1 | 1 | 0 | Q-correction | Valid | Buffer RAM |
| 1 | 1 | 1 | 0 | 1 | P-correction | Valid | Buffer RAM |
| 1 | 1 | x | 0 | 0 | Write-only (no ECC) | Valid | Buffer RAM |
| 1 | 0 | x | 0 | 0 | Disk-monitor | Invalid | Incoming data |
| 1 | 0 | x | x | 1 | Not recommended |  | (see note) |
| 1 | 0 | x | 1 | x | Not recommended |  | (see note) |
| 0 | x | x | x | x | Decoder disabled | Invalid | Invalid |

FIG. 23

| WAH/CTRL1 - Write Address Counter/Control 1 Register ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 0Bh | R | a15 | a14 | a13 | a12 | a11 | a10 | a9 | a8 |
| 0Bh | W | syien | syden | dscren | cowren | modrq | formrq | mbckrq | shdren |

FIG. 24

| STAT0/PTL - Status 0 Register/ECC Block Pointer ||||||||||
|---|---|---|---|---|---|---|---|---|---|
| Address | Type | Bit-7 | Bit-6 | Bit-5 | Bit-4 | Bit-3 | Bit-2 | Bit-1 | Bit-0 |
| 0Ch | R | crcok | ilsync | nosync | lblk | wshort | sblk | 0 | uceblk |
| 0Ch | W | a7 | a6 | a5 | a4 | a3 | a2 | a1 | a0 |

FIG. 25

| SYIEN 0Bh.7 | SYDEN 0Bh.6 | SYNC OPERATION | ILSYNC 0Ch.6 | NOSYNC 0Ch.5 | LBLK 0Ch.4 | SBLK 0Ch.2 |
|---|---|---|---|---|---|---|
| 1 | 1 | Sync-insertion +detection | active | active | inactive | inactive |
| 1 | 0 | Sync-insertion only | inactive | active | inactive | active |
| 0 | 1 | Sync-detection only | active | inactive | active | inactive |

FIG. 26

| RMO3 0Eh.7 | RMOD2 0Eh.6 | RMOD1 0Eh.5 | RMOD0 0Eh.4 | MODE |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | (8*N) +0 |
| 1 | 0 | 0 | 1 | (8*N) +1 |
| 1 | 0 | 1 | 0 | (8*N) +2 |
| 1 | 0 | 1 | 1 | (8*N) +3 |
| 1 | 1 | 0 | 0 | (8*N) +4 |
| 1 | 1 | 0 | 1 | (8*N) +5 |
| 1 | 1 | 1 | 0 | (8*N) +6 |
| 1 | 1 | 1 | 1 | (8*N) +7 or error |

FIG. 29

| STAT1/PTH - Status 1 Register/ECC Block Pointer | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 0Dh | R | 0 | 0 | 0 | hdera | 0 | 0 | 0 | shdera |
| 0Dh | W | a15 | a14 | a13 | a12 | a11 | a10 | a9 | a8 |

FIG. 27

| STAT2/SFCTRL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 0Eh | R | rmod3 | rmod2 | rmod1 | rmod0 | mode | nocor | rform1 | rform0 |
| 0Eh | W | unused | | | | | | | |

FIG. 28

| STAT3/RESET | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 0Fh | R | valstb | 0 | cblk | 0 | 0 | 0 | 0 | 0 |
| 0Fh | W | (data unused) | | | | | | | |

FIG. 30

| CTRLW | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 10h | R | unused | | | | | | | |
| 10h | W | 0 | swen | sdss | dclke | 0 | 0 | 0 | 0 |

FIG. 31

| CRTRG | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 11h | R | unused | | | | | | | |
| 11h | W | 0 | 0 | 0 | 0 | 0 | 0 | 0 | crtrl |

FIG. 32

| Address | Type | Bit-7 | Bit-6 | Bit-5 | Bit-4 | Bit-3 | Bit-2 | Bit-1 | Bit-0 |
|---|---|---|---|---|---|---|---|---|---|
| 12h | R | \multicolumn{8}{c}{unused} ||||||||
| 12h | W | \multicolumn{8}{c}{unused} ||||||||

FIG. 33

| Address | Type | Bit-7 | Bit-6 | Bit-5 | Bit-4 | Bit-3 | Bit-2 | Bit-1 | Bit-0 |
|---|---|---|---|---|---|---|---|---|---|
| 13h | R | \multicolumn{8}{c}{unused} ||||||||
| 13h | W | \multicolumn{8}{c}{unused} ||||||||

FIG. 34

| SUBH0 | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 14h | R | \multicolumn{8}{c}{subheader file number} ||||||||
| 14h | W | \multicolumn{8}{c}{unused} ||||||||

FIG. 35

| SUBH1 | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 15h | R | \multicolumn{8}{c}{subheader channel number} ||||||||
| 15h | W | \multicolumn{8}{c}{unused} ||||||||

FIG. 36

| SUBH2 | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 16h | R | \multicolumn{8}{c}{subheader submode number} ||||||||
| 16h | W | \multicolumn{8}{c}{unused} ||||||||

FIG. 37

| SUBH3 | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 17h | R | \multicolumn{8}{c}{subheader coding information} ||||||||
| 17h | W | \multicolumn{8}{c}{unused} ||||||||

FIG. 38

| DECODER OPERATION | REGISTER | ERASURE BYTE # | STORED BYTE # |
|---|---|---|---|
| Disk-monitor | SUBH0 | no erasures | incoming byte 16 |
| Disk-monitor | SUBH0 | byte 16 | incoming byte 20 |
| Disk-monitor | SUBH0 | byte 16 and 20 | incoming byte 20 |
| Buffered | SUBH0 | don't care | buffered byte 20 |
| Disk-monitor | SUBH1 | no erasures | incoming byte 17 |
| Disk-monitor | SUBH1 | byte 17 | incoming byte 21 |
| Disk-monitor | SUBH1 | byte 17 and 21 | incoming byte 21 |
| Buffered | SUBH1 | don't care | buffered byte 21 |
| Disk-monitor | SUBH2 | no erasures | incoming byte 18 |
| Disk-monitor | SUBH2 | byte 18 | incoming byte 22 |
| Disk-monitor | SUBH2 | byte 18 and 22 | incoming byte 22 |
| Buffered | SUBH2 | don't care | buffered byte 22 |
| Disk-monitor | SUBH3 | no erasures | incoming byte 19 |
| Disk-monitor | SUBH3 | byte 19 | incoming byte 23 |
| Disk-monitor | SUBH3 | byte 19 and 23 | incoming byte 23 |
| Buffered | SUBH3 | don't care | buffered byte 23 |

FIG. 39

| VER/XTAL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 1Ah | R | b7 | b6 | b5 | b4 | b3 | b2 | b1 | b0 |
| 1Ah | W | 0 | 0 | 0 | 0 | mck1 | 0 | 0 | xtald2 |

FIG. 40

| DSPSL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 1Bh | R | | | | unused | | | | |
| 1Bh | W | c2ml | sel16o | 1ch1 | 0 | 0 | sel16 | dir | edge |

FIG. 41

| UD7 c2ml | UD6 sel16o | UD5 1ch1 | UD4 X | UD3 X | UD2 sel16 | UD1 dir | UD0 edge | DSP Type |
|---|---|---|---|---|---|---|---|---|
| 1 | 0 | 1 | 0 | 0 | 0 | 1 | 0 | Sony CXD1135Q |
| 1 | 1 | 0 | 0 | 0 | 0 | 1 | 1 | Philips SAA7345 |
| 0 | 0 | 1 | 0 | 0 | 1 | 0 | 0 | Sanyo LC7860K |
| 0 | 0 | 0 | 0 | 0 | 1 | 1 | 1 | Toshiba |
| 0 | 0 | 1 | 0 | 0 | 1 | 0 | 1 | Matsushita MN66261 |

FIG. 42

| HCON/UACL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 1Ch | R | unused | | | | | | | |
| 1Ch | W | a7 | a6 | a5 | a4 | a3 | a2 | a1 | a0 |

FIG. 43

| DSPSL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 1Bh | R | unused | | | | | | | |
| 1Bh | W | c1ml | sel16o | 1ch1 | x | x | sel16 | dir | edge |

FIG. 44

| HCON/UACL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 1Ch | R | 0 | spare | spare | spare | dts | sdrqb | 1ohi | dma16 |
| 1Ch | W | a7 | a6 | a5 | a4 | a3 | a2 | a1 | a0 |

FIG. 45

| UACH | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 1Dh | R | unused | | | | | | | |
| 1Dh | W | a15 | a14 | a13 | a12 | a11 | a10 | a9 | a8 |

FIG. 46

| UACU | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 2Dh | W | 0 | 0 | 0 | 0 | b3 | b2 | b1 | b0 |

FIG. 47

| RAMRD/RAMWR | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 1Eh | R | rr7 | rr6 | rr5 | rr4 | rr3 | rr2 | rr1 | rr0 |
| 1Eh | W | rw7 | rw6 | rw5 | rw4 | rw3 | rw2 | rw1 | rw0 |

FIG. 48

| HDDIR | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 1Fh | R | urtbsy | cs13 | 0 | 0 | 0 | 0 | hrwr | 0 |
| 1Fh | W | udtrg | udata | host16 | 0 | 1 | 1 | 0 | 0 |

FIG. 49

| Bit-4 | Bit-3 | Bit-2 | Bit-1 | Bit-0 |
|---|---|---|---|---|
| 0 | 1 | 1 | 0 | 0 |

FIG. 50

| HICTL | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 20h | W | 0 | pdiagen | daspen | clrbsy | setbsy | scod | iordyen | iocs16en |

FIG. 51

| SUBC2 | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 21h | W | 0 | 0 | 0 | 0 | nopq | cdsp2 | cdsp1 | cdsp0 |

FIG. 52

| CDSP2 21h.2 | CDSP1 21h.1 | CDSP0 21h.0 | Subcode Block Rate |
|---|---|---|---|
| 0 | 0 | 0 | 1X (75 blocks/sec) |
| 0 | 0 | 1 | 2X (150 blocks/sec) |
| 0 | 1 | 0 | 4X (300 blocks/sec) |
| 1 | 0 | 0 | Reserved |

FIG. 53

| STATS | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 22h | R | data unused | | | | | missy | sbkend | silsy |
| 22h | W | data unused | | | | | | | |

FIG. 54

| DBACL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 24h | W | b7 | b6 | b5 | b4 | b3 | b2 | b1 | b0 |

FIG. 55

| DBACH | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 25h | W | 0 | 0 | 0 | 0 | 0 | 0 | 0 | b8 |

FIG. 56

| SBKL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 26h | RW | b7 | b6 | b5 | b4 | b3 | b2 | b1 | b0 |

FIG. 57

| SBKH | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 27h | RW | data unused | | | | | | | b8 |

FIG. 58

| WBKL | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 28h | RW | b7 | b6 | b5 | b4 | b3 | b2 | b1 | b0 |

FIG. 59

| WBKH | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 29h | RW | data unused | | | | | | | b8 |

FIG. 60

| RAMCF | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 2Ah | R | rftyp | ramclr | ram0 | uhilo | rpen | rcf2 | rcf1 | rcf0 |
| 2Ah | W | rftyp | ramclr | 0 | uhilo | rpen | rcf2 | rcf1 | rcf0 |

FIG. 61

| RCF2 2Ah.2 | RCF1 2Ah.1 | RCF0 2Ah.0 | RAM Configuration |
|---|---|---|---|
| 0 | 0 | 1 | 128K DRAM (256K X 4-bit X 1) |
| 0 | 1 | 0 | 256K DRAM (256K X 4-bit X 2) |

FIG. 62

| MEMCF - Memory Layout Configuration Register | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 2Bh | W | 0 | 0 | 0 | 0 | purg | iordyf | mly1 | mly0 |

FIG. 63

| MLY1 2Bh.1 | MLY0 2BH.0 | DRAM Memory Layout Configuration |
|---|---|---|
| 0 | 0 | Data Blocks + Last 2 Auxilary/Subcode Blocks |
| 1 | 1 | Data Blocks + All Auxilary/Subcode Blocks |

FIG. 64

| SUBCD - Subcode Control | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 2Ch | W | sbxck | scen | scbk2 | scien | exinv | exop | sbsel1 | sbsel0 |

FIG. 65

| SBSEL1 2Ch.1 | SBSEL0 2Ch.0 | - | Subcode Format |
|---|---|---|---|
| 0 | 0 | | SMD0 (Philips) |
| 0 | 1 | | SMD1 (EIAJ-1) |
| 1 | 0 | | SMD2 (EIAJ-2) |
| 1 | 1 | | Undefined |

FIG. 66

| UMISC - Miscellaneous Microcontroller Control | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 2Eh | R | 1 | 1 | 1 | 1 | 1 | 1 | pdiagb | daspb |
| 2Eh | W | ideien | 0 | drveb | drv1b | hintrq | 0 | 0 | 0 |

FIG. 67

| RSSTAT - Reset, IDE, and Subcode Status Register | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 2Fh | R | srst | cmd | diagcmd | sint | parint | rst | urst | hrst |

FIG. 68

| ATFEA/ATERR | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 31h | R | 0 | 0 | 0 | 0 | 0 | 0 | 0 | dma |
| 31h | W | b7 | b6 | b5 | b4 | mcr | abrt | eom | ili |

FIG. 69

| ATINT | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 32h | RW | 0 | 0 | 0 | 0 | 0 | 0 | io | cod |

FIG. 70

| ATSPA | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 33h | RW | 0 | 0 | 0 | 0 | 0 | 0 | 0 | 1 |

FIG. 71

| ATBLO | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 34h | RW | b7 | b6 | b5 | b4 | b3 | b2 | b1 | b0 |

FIG. 72

| ATBHI | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 35h | RW | b7 | b6 | b5 | b4 | b3 | b2 | b1 | b0 |

FIG. 73

| ATDRS | | | | | | | | | |
|---|---|---|---|---|---|---|---|---|---|
| Address | Type | Bit-7 | Bit-6 | Bit-5 | Bit-4 | Bit-3 | Bit-2 | Bit-1 | Bit-0 |
| 36h | RW | 1 | 1 | 1 | drv | 0 | 0 | 0 | 0 |

FIG. 74

| ATCMD/ATSTA | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 37h | R | b7 | b6 | b5 | b4 | b3 | b2 | b1 | b0 |
| 37h | W | 0 | drdy | 0 | drc | drq | corr | 0 | check |

FIG. 75

| DFIF0 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 40h | W | b7 | b6 | b5 | b4 | b3 | b2 | b1 | b0 |

FIG. 76

| DFIF1 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 41h | W | b7 | b6 | b5 | b4 | b3 | b2 | b1 | b0 |

FIG. 77

| DFIF2 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 42h | W | b7 | b6 | b5 | b4 | b3 | b2 | b1 | b0 |

FIG. 78

| DFIF3 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 43h | W | b7 | b6 | b5 | b4 | b3 | b2 | b1 | b0 |

FIG. 79

| DFIF4 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 44h | W | b7 | b6 | b5 | b4 | b3 | b2 | b1 | b0 |

FIG. 80

| DFIF5 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 45h | W | b7 | b6 | b5 | b4 | b3 | b2 | b1 | b0 |

FIG. 81

| DFIF6 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 46h | W | b7 | b6 | b5 | b4 | b3 | b2 | b1 | b0 |

FIG. 82

| DFIF7 | | | | | | | | |
|---|---|---|---|---|---|---|---|---|
| Address | Type | Bit-7 | Bit-6 | Bit-5 | Bit-4 | Bit-3 | Bit-2 | Bit-1 | Bit-0 |
| 47h | W | b7 | b6 | b5 | b4 | b3 | b2 | b1 | b0 |

FIG. 83 ns Ser. No. 10/082,990,

OPTICAL DRIVE CONTROLLER WITH A HOST INTERFACE FOR DIRECT CONNECTION TO AN IDE/ATA DATA BUS

CROSS-REFERENCE TO RELATED APPLICATIONS

This is a continuation of application Ser. No. 10/082,990, now U.S. Pat. No. 6,721,828, filed Feb. 25, 2002, which is a continuation of application Ser. No. 09/442,866, now U.S. Pat. No. 6,546,440, filed Nov. 18, 1999, which is a continuation of application Ser. No. 08/673,327, now U.S. Pat. No. 6,584,527, filed Jun. 28, 1996, which is a continuation of application Ser. No. 08/264,361, now U.S. Pat. No. 5,581,715, filed Jun. 22, 1994.

BACKGROUND OF THE INVENTION

1. Field of the Invention

This invention relates generally to the access of digital data from optical storage media by a personal computer. Optical storage methods allow information to be recorded and recovered from a given material by using light. The compact disk (CD) media currently used in optical recording is capable of significantly higher areal density than magnetic disks. This capacity to store a large amount of information per unit area of the media surface is a major advantage of CD technology over magnetic disk storage techniques.

2. Prior Art

The field reliability of CD systems is yet to be determined due to the relatively short period of time this media has been in use. However, optical recording systems are expected to be more reliable than magnetic disk drives, generally referred to as hard disks, for several reasons. The optical heads used for recording and recovering information are spaced away from the disk at all times, eliminating the possibility of head crashes. And the optical techniques used cause no wear or tear on the media surface during reading or transferring of information.

The reliability characteristic of optical storage media appears to be especially advantageous where the removability and transportability of the media is critical. Compared to magnetic disk drives, both hard and floppy, the operation of a CD is much less sensitive or affected by dust accumulation on either the head or the media. And the optical methods of reading and writing data without making physical contact with the media surface significantly reduces the potential for damage in removable disk applications.

The integration of CD drives into personal computers comprises one of the largest markets for optical storage media applications for the foreseeable future. At present, the cost of a CD drive is a primary barrier to the growth of this market. However, the CD-ROM (read only memory) standard as originally developed by Sony and Phillips has become the standard defining the physical characteristics and disk format for data storage and retrieval. This format has become very popular for making large amounts of information available to users at a relatively low cost and there is an increasingly large library of CD-ROM titles available. CD drives which are capable of writing information to the CD are much less widely used today due to their much greater cost and complexity.

All CD drive designs include a CD load mechanism, a spindle, drive electronics and a controller. The drive electronics recovers data from the CD as directed by the controller. The controller manages the flow of commands, status flags and data between the host personal computer and the CD drive electronics.

Conventional CD drive designs support the Industry Standard Architecture (ISA) bus convention and require the insertion of an interface card or host adapter card into an ISA input/output bus slot of the host personal computer. These disk drive designs include a variety of proprietary and manufacturer specific designs as well as designs that support the three varying software driver formats used with the Small Computer Systems Interface (SCSI) standard. These three software driver formats include Microsoft's Layered Device Driver Architecture, the American National Standards Institutes' Common Access Method, and the Advanced SCSI Programming Interface.

A SCSI disk drive includes a controller and a SCSI slave interface. A SCSI disk drive communicates with a host computer through a SCSI host adapter card which must be resident on the ISA bus of the host. There are three types of host adapter cards, namely a register compatible controller, an INT 13 h compatible controller, and an installable device driver. These types of host adapter designs are fully explained in widely available technical publications.

The reliance of all conventional CD drive designs exclusively on the use of the ISA input/output bus results in the additional expense of host adapter card electronics. Furthermore, a reduction in the range of employment of any given computer system due to the permanent commitment of an input/output bus slot to communication with the CD drive controller is a limitation in the prior art.

An alternative bus structure is available within standard personal computer architecture available for use with a CD drive controller. This structure is referred to as integrated drive electronics with an AT attachment interface, or IDE/ATA. The American National Standards Institute has published this standard and it is currently widely available. The term integrated drive electronics includes any drive with a controller included. For example, all SCSI drives are in fact IDE drives. The term IDE/ATA applies to a drive if and only if its interface conforms to the industry standard AT attachment specification. IDE/ATA drives do not take up an ISA input/output slot. This class of interface is connected by means of a dedicated 40 pin connector found on many personal computer mother boards.

Conventional CD drives in the prior art failed to make use of the IDE/ATA bus. However, now that the AT standard has become widely used in many personal computers, it would be desirable to provide a CD drive with built-in controller functionality and a standard connector. This would obviate the need for an additional host adapter card and associated electronics. Providing these electronics in addition to the CD drive itself increases the overall cost of a system using a CD drive for data storage and retrieval and also makes a CD drive more complicated to install on existing personal computers in use today. Due to the plethora of methods of ISA interface designs used in the industry today, compatibility issues often occur when, for example, a particular CD drive controller is tasked with communicating with another ISA bus connected peripheral device. The high frequency of incompatibility often prohibits the employment of the most cost efficient or highest performance combination of devices. The present invention, a controller for CD drives which can be implemented with a drive using a standard AT connector, overcomes the problems associated with the prior art as will be made clear in the following discussions thereof.

SUMMARY OF THE INVENTION

This invention relates to a compact disk drive controller for a compact disk drive to control the communication of digital information between a compact disk to a host computer. The compact disk drive would generally have it's own drive electronics comprising a digital signal processor, a microcontroller, a random access memory, and a system controller. The host computer communicates with the compact disk drive controller via an IDE data bus and receives digital information from the compact disk via the IDE data bus. The compact disk drive controller is comprised of a host interface, connecting the host computer via the IDE data bus with the compact disk drive controller, in order to receive data addresses and commands from the host computer and transmit digital information to the host computer. A path for communicating data addresses and commands from the host interface to the microcontroller of the drive electronics is employed and a digital signal processor (DSP) interface connecting the host interface and the digital signal processor of the drive electronics, receives digital information from the compact disk and transmits the digital information to said host interface.

The digital signal processor interface of the compact disk drive controller (CDDC) further comprises a descrambler to descramble and assemble the digital information received from said digital signal processor and store said digital information into said random access memory.

The digital signal processor interface of the CDDC further comprises an error correction code circuit to perform error correction on said digital information. That error correction circuit could employ Reed-Solomon codes.

The digital signal processor interface of the CDDC further comprises a cyclic redundancy checker for detecting errors in the digital information after correction of the digital information by the error correction code circuit.

The host interface of the CDDC may receive data addresses and commands from the host computer via an ISA data bus and may communicate digital information to the host computer via the ISA bus.

The host interface of the CDDC further comprises a command FIFO to transfer commands from the host computer to the system controller of the drive electronics of the compact disk drive.

The host interface of the CDDC further comprises a configuration register via which the host computer instructs the compact disk drive controller to present the digital information onto one of the ISA and IDE data buses in a data format selected from a group including 16-bit DMA, 8-bit DMA, 16-bit PIO, and an 8-bit PIO format.

A BRIEF DESCRIPTION OF THE DRAWINGS

FIGS. 3a–3c are a pin diagram and accompanying pin-out assignments for an implementation of the present invention.

FIG. 4 is a pin description of the system controller interface of an implementation of this invention.

FIG. 5a is a pin description of the host interface of an implementation of this invention.

FIG. 5b is an address map of the host registers of an implementation of this invention.

FIG. 6 is a pin description of the DSP interface of an implementation of this invention.

FIG. 7 is a pin description of the subcode interface of an implementation of this invention.

FIG. 8a is a pin description of the RAM interface of an implementation of this invention.

FIG. 8b is a pin description for the RAM address bus of the RAM interface of an implementation of this invention.

FIG. 9 is a pin description of miscellaneous pins of an implementation of this invention.

FIG. 10 is a description of the address register.

FIG. 11 is a description of command packet register.

FIG. 12 is a description of interface status and interface control registers.

FIG. 13 and FIG. 14 are descriptions of DBCL and DBCH (Data Byte/Word Counter).

FIG. 15, FIG. 16, FIG. 17 and FIG. 18 are descriptions of HEAD0 to HEAD3 (Header Registers).

FIG. 19 is a list of DACH, DACL settings for various starting points.

FIG. 20 and FIG. 21 are ECC block pointer/write address counters.

FIG. 22 is a description of WAL/CTRL0 (Control-0 Register).

FIG. 23 is a description of CTRL0 DECODER OPERATION TABLE.

FIG. 24 is a description of CTRL1 (Control-1 Register).

FIG. 25 is a description of STAT0 (Status-0 Register).

FIG. 26 is a description of STAT0 BLOCK SYNC STATUS TABLE.

FIG. 27 is a description of SSTAT1 (Status-1) register.

FIG. 28 is a description of STAT2 (Status-2) register.

FIG. 29 is a description of STAT2 RMODE TABLE.

FIG. 30 is a description of STAT3/RESET (Status-3) register.

FIG. 31 is a description of CTRLW (Control-Write) register.

FIG. 32 is a description of CRTRG (Correction Retry Trigger).

FIGS. 33 through 38 are descriptions of SUBH0 to SUBH3 (Subheader Registers).

FIG. 39 is a description of Subheader Byte Number Table.

FIG. 40 is a description of VER (Version) register.

FIG. 41 is a description of DSPSL (DSP Selection) register.

FIG. 42 DSP SELECTION TABLE shows the settings for various DSPs.

FIG. 43 is a description of the HCON/UACL register.

FIG. 44 is a description of the DSPSL register.

FIGS. 45, 46 and 47 are descriptions of the UACL, UACH and UACU Microcontroller-RAM Address Counter.

FIG. 48 is a description of the RAMRD/RAMWR RAM Read and Write registers.

FIG. 49 is a description of HDDIR Host data Direction Register.

FIG. 50 is a list of the only values that should be written to HDDIR—write bits 4, 3, 2, 1 and 0, following hardware or firmware reset.

FIG. 51 is a description of the HICTL Host Interface Control register.

FIG. 52 is a description of SUBC2 Subcode Control-2 register.

FIG. 53 is a description of the DSP Subcode Clock TABLE.

FIG. 54 is the STATS Status of subcode register.

FIGS. 55 and 56 are descriptions of DBACL and DBACH Data Transfer Block Registers.

FIGS. 57 and 58 are descriptions of SBKL and SBKH Subcode Write Block Registers.

FIGS. 59 and 60 are descriptions of WBKL and WBKH Decoder and Buffer-Write Block Counter registers.

FIG. 61 is a description of RAMCF RAM Configuration Register.

FIG. 62 is a table of RCF2, RCF1 and RCF0—bits 2, 1 and 0—RAM Configuration.

FIG. 63 is a description of MEMCF (Memory Layout Configuration) register.

FIG. 64 is a description of MLY1 and MLY0—bits 1 and 0—Memory Layout Configuration.

FIG. 65 is a description of SUBCD Subcode Control register.

FIG. 66 is SBSEL1 and SBSEL0—bits 1 and 0—Subcode Format Select Table.

FIG. 67 is a description of UMISC (Miscellaneous Microcontroller Control) register.

FIG. 68 is a description of RSSTAT—Reset, IDE, and Subcode Status Register.

FIGS. 69–75 are descriptions of ATAPI Task File Registers (TR).

FIG. 69 is a description of ATFEA and ATERR.

FIG. 71 is a description of ATSPA—Spare TR.

FIG. 72 is a description of ATBLO—I/O of Byte Count Low TR.

FIG. 73 is a description of ATBHI—I/O of Byte Count High TR.

FIG. 74 is a description of ATDRS—I/O of Drive Select TR.

FIG. 75 is a description of ATCMD—Output from Command Register.

FIGS. 76–83 are descriptions of the Microcontroller to Host Data Transfer Registers.

DESCRIPTION OF A PREFERRED EMBODIMENT

Figure 1:
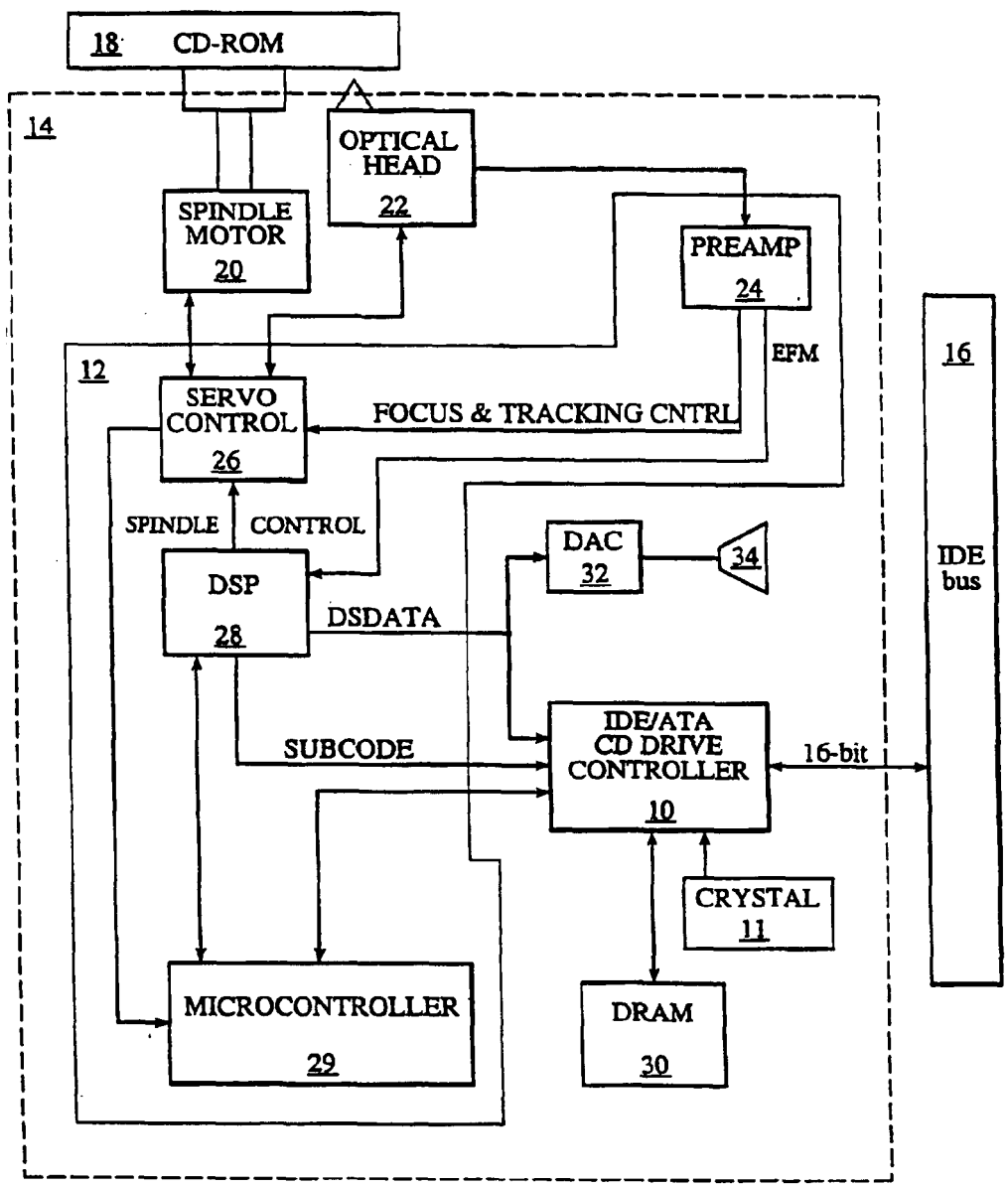
FIG. 1 is a block diagram of a CD drive configuration of the prior art with the IDE/ATA CD drive controller of the present invention added thereto.

Reference is now made to FIG. 1 which is a block diagram of a compact disk (CD) drive configuration of the prior art with a CD drive controller of the present invention added thereto. The CD drive controller designed according to this invention would communicate command data, status signals and other data over the integrated device electronics/AT attachment (IDE/ATA) bus of a personal computer. This invention reduces the cost of a CD drive by eliminating the need for a host adapter card or additional ISA bus interface electronics. This invention also allows the CD drive to integrate into many personal computers without requiring the use of an ISA input/output bus slot. Furthermore, this invention will allow for a wider selection of personal computer peripheral cards, such as sound and boards, for use with a given personal computer and CD drive. The method of the current invention reduces this potential for incompatibility, and permits a broad range of selection of peripheral devices.

The drive controller 10 is connected to drive electronics 12 of a CD drive 14 and IDE/ATA bus 16 of a personal computer. The clock speed of the controller will be determined by crystal oscillator 11. It will be understood that the compact disk 18 is not a part of the present invention but it is shown for clarity. The CD drive includes a spindle motor 20 for rotating the CD and an optical head 22 for reading data from the CD. The drive electronics of the CD drive include a preamplifier 24 which sends a signal to servo control 26 of the CD drive for focus and tracking control. The servo control communicates with the spindle motor and optical head to position the optical head precisely to read the correct information from the CD. Digital data read from the preamplifier goes to digital signal processor (DSP) 28 in the drive electronics. The DSP sends subcode information as well as digital data to the drive controller of this invention. A microcontroller 29 in the CD drive electronics also communicates with the DSP and servo control of the drive electronics, as well as with the drive controller of the present invention, to control the reading of information from the CD. A DRAM 30 is coupled with the drive controller of the present invention for storing and buffering data via the drive controller. Data can be sent to digital-to-analog convertor (DAC) 32 and peripheral 34 (such as a monitor) from the DSP or from the drive controller.

Figure 2:
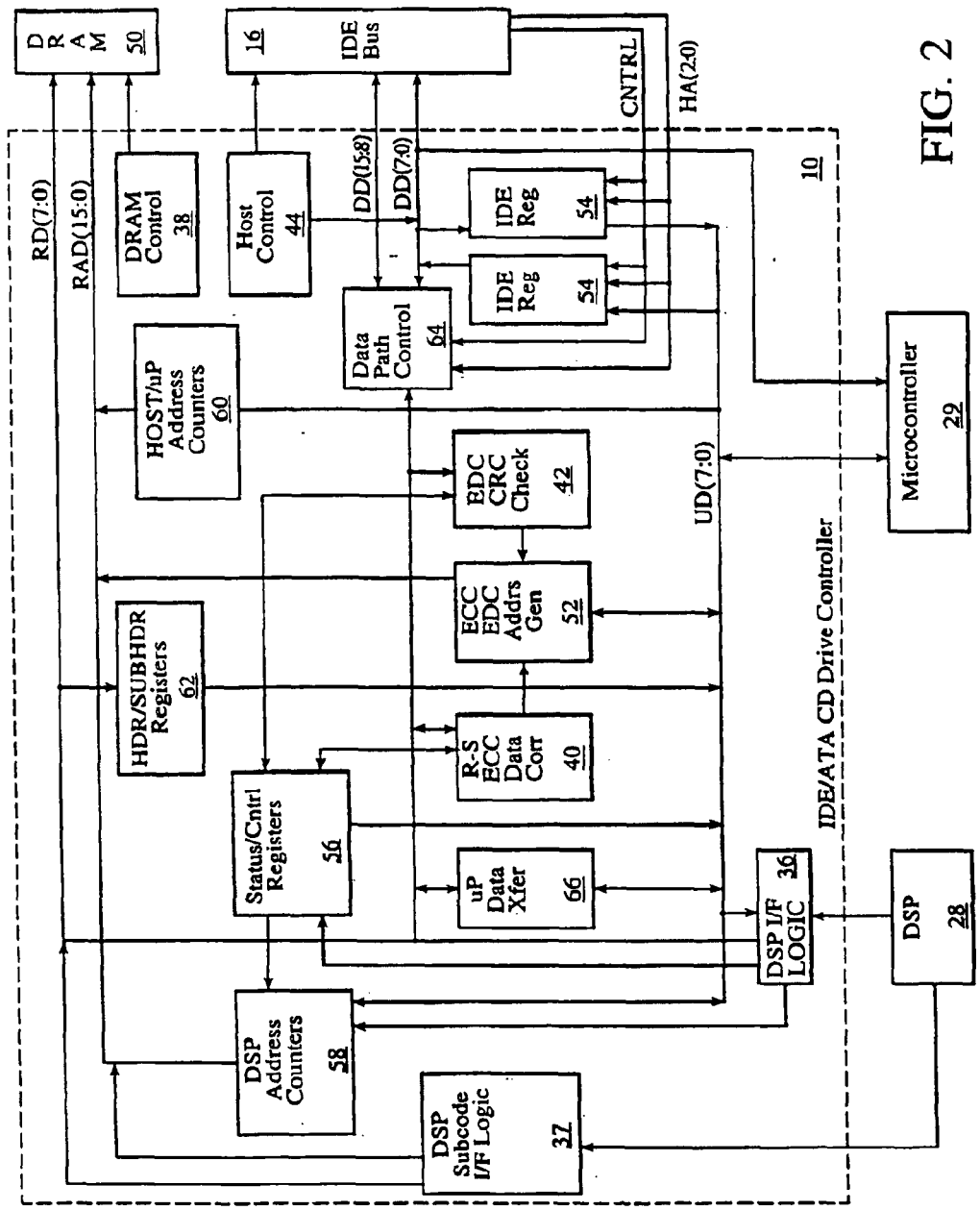
FIG. 2 is a block diagram of an implementation of the present invention.

FIG. 2 is a block diagram of an implementation of the drive controller 10 of the present invention. The key functional blocks are the DSP data and subcode interfaces 36 and 37, the buffer DRAM control 38, the error correction code (ECC) data corrector 40, the error detection and correction/cyclic redundancy checker (EDC/CRC) 42 and host control or interface 44. The DSP data interface descrambles and assembles data from the DSP 28, then stores the data into the RAM. The DSP subcode interface assembles subcode and stores P-W data into the RAM. A DSP address counter 58 generates an address for each block of data stored to the DRAM from the DSP interface. The error correction circuitry would first perform Reed-Solomon error correction on each block of data. Reed-Solomon codes are random single- or multiple-symbol error correcting codes operation on symbols which are elements of a finite field. All encoding, decoding, and correction computations are performed in the field. (See Practical Error Correction Design for Engineers, revised second edition, Cirrus Logic 1991 by Neal Glover and Trent Dudley). Then, a cyclic redundancy check of the corrected data would be performed. Since each codeword contains two parity bytes the drive controller of this invention can correct one error in each codeword. These ECC and EDC-CRC circuits are commonly available as hardware used in many other applications. The host control allows the corrected data to be transferred from the RAM to the host. Diagnostic data can be transferred from the host to the RAM, allowing testing of the ECC, EDC, host control RAM and system controller. Operation of the drive controller is controlled by the microcontroller 29, sometimes referred to as a system controller through an 8-bit bus. The invention can decode CD media according to the Sony-Philips standard for CD-ROM and CD-I formats. These formats divide each 2 KB data block into two planes, each plane containing 43 P-codewords and 26 Q-codewords. Each codeword contains two parity bytes.

The host computer (not shown) is connected, through the IDE/ATA bus 16 and associated host interface, to the microcontroller 29 of the drive electronics of the CD drive and the host control 44. The host interface provides 8/16 bit peripheral input/output (PIO) and direct memory access (DMA) transfers of data to the host personal computer. The output buffers 54 of the invention can directly drive an IDE/ATA bus. The host interface also contains control and transfer status registers 56 accessible by the host. The design of the present invention allows the transfer of diagnostic data from the host to the RAM, allowing testing of the error correction circuitry, the host interface, the RAM itself and the system controller of the drive electronics.

The DRAM controller is connected to DRAM 50. The DRAM controller, under the direction of the host interface, accomplishes the transfer of data to the host and the error correction operations so as to insure an uninterrupted flow of data from the buffer RAM. The DRAM receives information from the DSP of the drive electronics via the DSP data and subcode logic interfaces. The DRAM also receives address information from the host microprocessor address counter 60, as well as receives corrected and addressed information from an ECC EDC address generator 52 which is connected with the error correction circuit ECC and the cyclic redundancy checker EDC CRC. Additionally, the DRAM stores header and subheader information to the header/subheader register 62.

Thus, the drive controller 10 accepts digital data from the CD drive's electronics 12, particularly the microcontroller 29 and DSP 28, in a serial stream, descrambles the data, and assembles it into 8-bit bytes. The controller 10 then stores the data into the DRAM buffer 50. The error correction and detection operations performed by the ECC 40 and EDC CRC 42 on each sector of data are managed by the DRAM controller 38, which insures, through the direction of the host interface or control 44, that a sector of data is being corrected while the transfer of previously corrected sectors of data is occurring in real-time and without interrupting the flow of data from the drive controller 10 to the IDE bus 16. The flow of data is controlled by a data path controller 64. Therefore, the controller 10 of the present invention communicates corrected command data, status signals, and other corrected data over the IDE bus 16 of the host computer, eliminating the need for a host adapter card or additional ISA bus interface electronics, to reduce the cost of the CD drive 14. The invented controller 10, additionally, allows the CD drive 14 to integrate into many different personal computers, without requiring the use of an ISA input/output bus slot of the host computer.

Figure 3A:
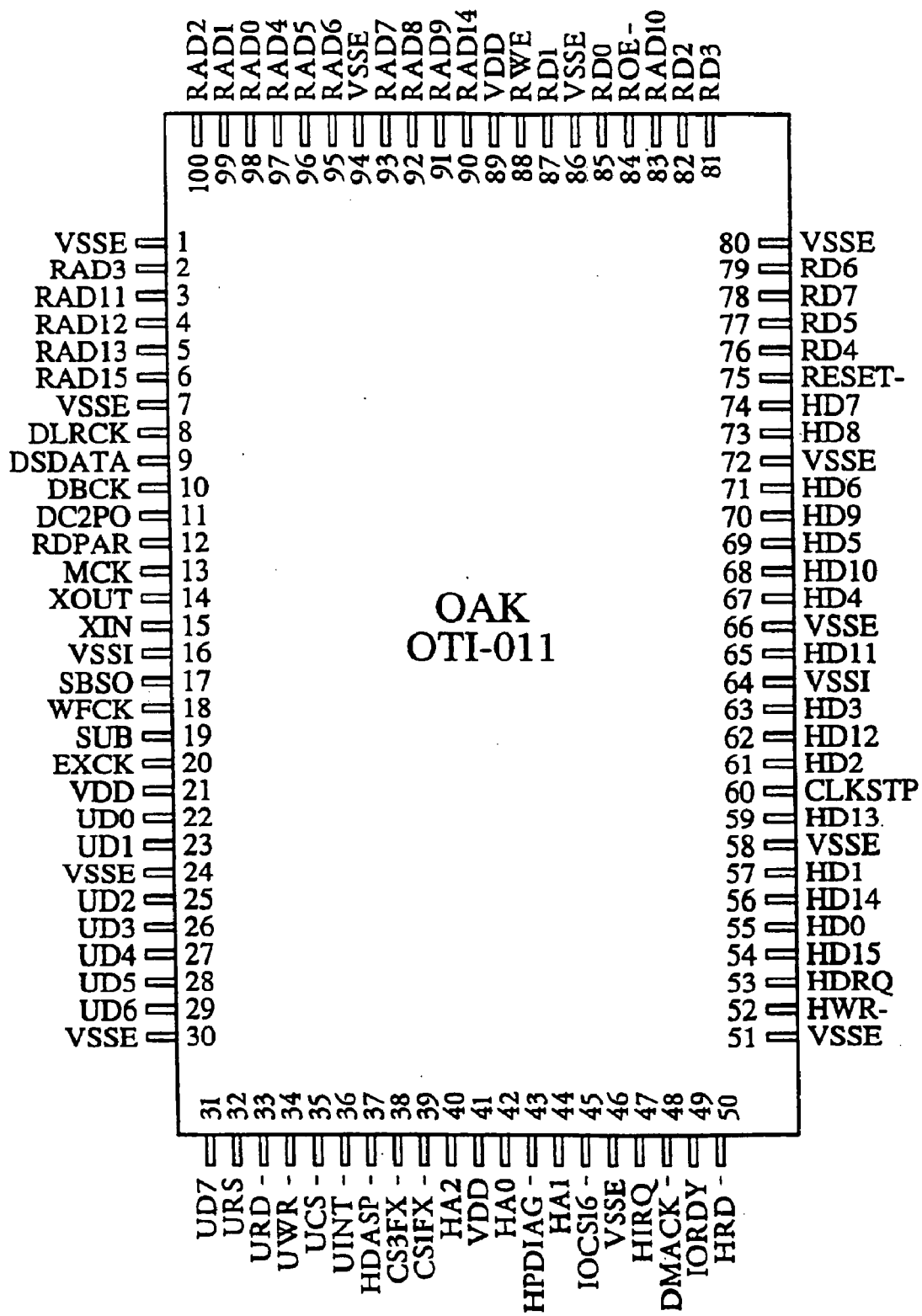

FIGS. 3a–3c are a pin diagram and accompanying pin-out assignments for an implementation of the present invention. The functions performed by this implementation will become clear by the following discussion.

FIG. 4 is a pin description of the system controller interface of an implementation of this invention. The system controller is the microcontroller that controls the operation of the IDE CD-ROM controller. The system controller interface contains an 8-bit bi-directional data transfer bus and is compatible with most microcontrollers.

FIG. 5a is a pin description of the host interface of an implementation of this invention. This invention will support the ATAPI CD-ROM specification for an IDE CD-ROM interface. The drive controller can drive IDE interface signal lines directly. The host interface contains a 12 bytes command packet FIFO (first in first out) and IDE registers. These are used to direct or command the host interface by the host controller and to inform the host controller as to the precise status of the drive electronics. The host interface block also contains a data FIFO register for transferring data from the DRAM buffer to the host and vice versa. FIG. 5b is an address map of the host registers of an implementation of this invention. The logic conventions are as follows: A=signal asserted, N=signal negated.

FIG. 6 is a pin description of the DSP interface of an implementation of this invention. This invention is designed to work with various DSP chips, which are selected using the DSPSL register. Serial data is received from the DSP. FIG. 7 is a pin description of the subcode interface of an implementation of this invention. P-W subcode information provided serially by the DSP will be stored into the data block of the DRAM simultaneously. This invention will support several different subcode interface protocols, which are selected using the SUBCD register. The command FIFO register COMIN is used to direct the host interface by the host controller.

FIG. 8a is a pin description of the RAM interface of an implementation of this invention. This embodiment allows users to use conventional 128 KB/256 KB DRAM. FIG. 8b is a pin description for the RAM address bus of the RAM interface of an implementation of this invention. Note that several RAM address bits are reserved for future support of larger RAM sizes. FIG. 9 is a pin description of miscellaneous pins of an implementation of this invention.

Microcontroller Registers

The following map and description of the registers of an embodiment of this invention is intended for use in designs supporting the following configurations:

1. Type of RAM: 256K×4×1 DRAM or 256K×4×2 DRAM
2. Type of Host Interface: ATA (IDE) plus ATAPI CD-ROM FIG. 10 is a description of the address register. The internal registers are indirectly addressed. The AR register holds the address of the register accessed with the subsequent R/W operation. The AR is read or written by the microcontroller if URS=0. If URS=1, the register addressed by the AR is read or written.

Except for address 00h (COMIN/SBOUT), the 4 least significant bits (bits 0–3) of the AR are automatically incremented following each read or write to any register For example, if the AR has been set to 2Ch, the AR automatically increments according to the following sequence during 18 consecutive reads or writes (with URS=1): 2Ch, 2Dh, 2Eh, 2Fh, 20h, 21h, 22h, 23h, 24h, 25h, 26h, 27h, 28h, 29h, 2Ah, 2Bh, 2Ch, 2Dh.

Note: The AR does not automatically increment from 00h to 01h. Consecutive accesses to address 00h will repeatedly read (COMIN) or write (SBOUT). For example if the AR has been set to 0Ch, the AR automatically increments according to the following sequence during 7 consecutive reads or writes (with URS=1): 0Ch, 0Dh, 0Eh, 0Fh, 00h, 00h, 00h.

FIG. 11 is a description of command packet register. This register accesses the 12-byte Packet FIFO which receives commands or data from the host. The data transfer end interrupt (DTEIb) flag in the IFSTAT register is active (set to 0) while the 12-byte Packet FIFO is full. The command interrupt (CMDIb) flag in the IFSTAT register is active (set to 0) while one or more bytes from the host are present in the Packet FIFO. If an access from COMIN is attempted while the FIFO is empty, the value Ffh will be read.

Normally, flag DTEIb is used for receiving 12-byte packet commands from the host, and flag CMDIb is used for receiving data from the host (which may not be 12-bytes). Registers ATBHI and ATBLO (addresses 34h and 35h) can be used to control the number of consecutive bytes of DATA written into the Packet FIFO by the host. However, ATBHI and ATBLO should not be used to control the number of COMMAND bytes. Command or data writes from the host to the data port (IFO) are stored in the Packet FIFO if control bit Scod in register HICTL (20h.2) is set high. Note: An access to the COMIN register (00h) does not increment the AR.

UNUSED (01h-write) writes to address 00h in the controller accessed the SBOUT (status byte output register. However, SBOUT is not useful for ATAPI operations.

Address 00h should not be written to. Note: An access to address 00h does not increment the AR.

FIG. 12 is a description of interface status and interface control registers.

IFSTAT (Interface Status Register) holds the decoder and host interface status bits.

CMDIb—bit 7—Command Interrupt flag is active-low with a logical 0 indicating an interrupt flag. "0" indicates that there are one or more bytes present in the Packet FIFO and "1" indicates that the Packet FIFO is empty. Flag CMDIb is used for receiving data from the host, which may not be 12-bytes. For receiving 12-byte packet commands, flag DTEIb in register IFSTAT is used instead. CMDIb is automatically cleared (set to 1) after the last byte in the Packet FIFO is read. If control bit CMDIEN in the IFCTRL register (01h.7) is set high, pin UINTb (the microcontroller interrupt) will be active-low whenever the CMDIb flag is active-low.

DTEIb—bit 6—Data-Transfer-End Interrupt flag is active-low with a logical 0 indicating an interrupt flag. "0" indicates that a host read from the Data FIFO or external RAM, or a 12-byte host write to the Packet FIFO (Packet FIFO full), is complete and "1" indicates that the interrupt flag has been cleared. DTEIb is automatically cleared when the microcontroller writes to the DTACK register (07h). If control bit DTEIEN in the IFCTRL register (01h.6) is set high, pin UINTb (the microcontroller interrupt) will be active-low whenever the DTEIb flag is active-low.

DECIb—bit 5—Decoder Interrupt flag is active-low with a logical 0 indicating an interrupt flag. "0" indicates that the decoder has finished processing a block and "1" indicates that the interrupt flag has been cleared. When DECIb changes to active-low, the header registers (HEAD0–3), ECC block pointer registess (PTL, PTH), and status registers (STAT0–3) are ready to be read. If the ECC or EDC is enabled, DECIb changes to active-low at the completion of the EDC phase. If the ECC and EDC are disabled (write-only or disk-monitor operation), DECIB changes to active-low after the header registers (HEAD0–3) are ready. DECIb is automatically cleared (to 1) when the microcontroller reads the STAT3 register (0Fh).

X—bit 4 is undefined, and may return a 0 or 1.

DTBSYb—bit 3—Data Transfer Busy flag is active-low with a logical 0 indicating a busy flag. "0" indicates that a data-transfer is in process and "1" indicates that no data-transfer in process. DTBSYb changes to active-low when the microcontroller writes to the data transfer trigger (DTTRG). DTBSYb is automatically cleared (to 1) when the host BEGINS to read the last byte to be transferred from the Data FIFO or external RAM.

X—bit 2 is undefined, and may return a 0 or 1. SBOUT is not useful for ATAPI operation.

DTENb—bit 1—Date Enable is active-low with a logical 0. "0" indicates that a data-transfer is in process and "1" indicates that no data-transfer is in process. After DTTRG is set, DTENb changes to active-low when the Data FIFO is ready to be read by the host. DTENb is automatically cleared (to 1) after the host reads the last byte to be transferred from the Data FIFO or external RAM.

X—bit 0 is undefined, and may return a 0 or 1. SBOUT is not useful for ATAPI operation.

IFCTRL (Interface Control Register) provides control of the microcontroller interrupt and host interface.

CMDIEN—bit 7—Command Interrupt Enable "1" allows pin UINTb (the microcontroller interrupt pin) to become active-low whenever the CMDIb flag in register IFSTAT is active-low. "0" inhibits the CMDIb flag from activating pin UINTb. CMDIEN controls the operation of pin UINTb. However, CMDIEN does not clear the interrupt request or control the CMDIb flag. CMDIEN is cleared to 0 by hardware reset or firmware reset.

DTEIEN—bit 6—Data-Transfer-End Interrupt Enable "1" allows pin UINTb (the microcontroller interrupt pin) to become active-low whenever the DTEIb flag in register IFSTAT is active-low. "0" inhibits the DTEIb flag from activating pin UINTb. DTEIEN controls the operation of pin UINTb. However, DTEIEN does not clear the interrupt request or control the DTEIb flag. DTEIEN is cleared to 0 by hardware reset or firmware reset.

DECIEN—bit 5—Decoder Interrupt Enable "1" allows pin UINTb (the microcontroller interrupt pin) to become active-low whenever the DECIb flag in register IFSTAT is active-low. "0" inhibits the DECIb flag from activating pin UINTb. DECIEN controls the operation of pin UINTb. However, DECIEN does not clear the interrupt request or control the DECIb flag. DECIEN is cleared to 0 by hardware reset or firmware reset.

DOUTEN—bit 1—Data Output Enable "1" enables host data reads from the Data FIFO or external RAM, or host writes to the Packet FIFO. "0" inhibits data transfers to the Data FIFO, external RAM, or Packet FIFO. Clearing DOUTEN (to 0) aborts data transfers to the FIFOs or external RAM. DOUTEN is cleared to 0 by hardware reset or firmware reset.

Unused Bits—bits 4, 3, 2, and 0 should only be set to 0.

FIG. 13 and FIG. 14 are descriptions of DBCL and DBCH (Data Byte/Word Counter) that form a 12-bit counter that controls or monitors the number of bytes or words transferred from the Data FIFO or external RAM to the Host. For 16-bit transfers, the number of WORDS minus one should be loaded into this counter. For 8-bit transfers, the number of BYTES minus one should be loaded. DBCH should always be written after DBCL is written, and zero should be written into bits 7–4 of DBCH. During the data transfer, the counter is decremented by one each time the host reads a word or byte. When reading DBCH, bits 7–4 each indicate the status of the data-transfer-end interrupt (DTEI), and have the same function (but opposite polarity) as the DTEIb flag in register IFSTAT. DBCL and DBCH are undefined following hardware reset or firmware reset.

FIG. 15, FIG. 16, FIG. 17 and FIG. 18 are descriptions of HEAD0 to HEAD3 (Header Registers). Normally, these registers provide the header of each CD-ROM block, and are used to find the starting block during a disk seek. If control bit DECEN in register CTRL0 (0Ah.7) is enabled, the first four bytes (bytes 12–15) following each data sync are automatically stored in the header registers (HEAD0–3). During disk-monitor operation (see the description of register CTRL0), uncorrected header bytes are taken directly from incoming serial data. If the incoming serial data is buffered, header bytes are taken from the buffer RAM, and are corrected if mode 1 is selected and ECC is enabled. In either case, HEAD0–3 should be read soon after the decoder interrupt occurs (bit DECIb in register IFSTAT becomes 0). HEAD0–3 remains valid until the next sync occurs (see the description of register STAT3 for checking the valid time period). Generation of checkbytes during the authoring of CD-ROM disks includes ECC coverage of the header bytes for mode 1 blocks, but not for mode 2 blocks. Therefore if ECC is enabled, the header bytes are not valid unless the proper mode is selected using control bit MODRQ in register CTRL1 (0Bh.3). Operation of a mode 2 disk with mode 1 ECC causes the header bytes to be erased. By setting control bit SHDREN in register CTRL 1 high, HEAD0–3 can be used to provide subheader bytes instead of header bytes. However, it is more convenient to use registers SUBH0–3 (14h–17h), which are not controlled by bit SHDREN, for this purpose. See the description of SUBH0–3 for subheader information. Subheaders in HEAD0–3 follow the same format and operation as subheaders in SUBH0–3. HEAD0–3 are undefined following hardware reset or firmware reset.

FIG. 19 is a list of DACH, DACL settings for various starting points. DACL and DACH are Data Address Counters. DACL and DACH form a 16-bit counter that controls the buffer RAM address for transfers to the host. The microcontroller writes the starting address that corresponds to the required starting point in the CD-ROM block. After the starting address is set and register DTTRG is triggered, DACL and DACH are incremented automatically each time a byte or word is read by the host. The first byte of User Data is located at address 00h. DACH should always be written after DACL is written. For proper addressing, the mode of the CD-ROM block should be selected using control bit MODRQ in register CTRL1 (0Bh.3). DACL and DACH control the RAM address relative to the beginning of the block. The block number should also be specified, using data block registers DBACL and DBACH (24h and 25h). DACL and DACH are undefined following hardware reset or firmware reset.

DTTRG (Data Transfer Trigger) triggers the host transfer logic and prepares the Data FIFO, causing flag DTBSYb in register IFSTAT (01h.3) to become active-low. Before setting or triggering any data transfer registers, control bit DOUTEN in register IFCTRL (01h.1) should be enabled. In the case of a host data read from the buffer RAM, triggering the transfer logic automatically fills the FIFO with data from the RAM. The count, RAM starting address, and block number should be set using registers DBCL, DBCH, DACL, DACH, DBACL, and DBACH (02h, 03h, 04h, 05h, 24h, and 25h) before triggering DTTRG. Flag DTENb in register IFSTAT (01h.1) becomes active-low when the FIFO first becomes ready. The microcontroller can also load registers UDTA0–UDTA7, allowing host data reads (up to 8-bytes) from the microcontroller without using the buffer RAM. In this case the byte count, microcontroller data enable, and data bytes should be set using registers DBCL, DBCH, HDDIR, and UDTA0–7 (02h, 03h, 1Fh.6, and 40h–47h) before triggering DTTRG. After triggering DTTRG, trigger bit UDTRG in register HDDIR (1Fh.7) should be toggled to 1 followed by 0. For this type of transfer, flag DTENb in register IFSTAT (01h.1) has no meaning. Trigger DTTRG is not used for host writes to the Packet FIFO.

DTACK (Data Transfer Acknowledge) clears flag DTEIb to 1 in register IFSTAT (01h.6) and also clears the corresponding microcontroller interrupt (if enabled), terminating the data transfer sequence.

FIG. 19 and FIG. 20 are ECC block pointer/write address counters. PTL and PTH form a pointer used by the ECC logic, and contain the 12 least significant address bits of the first header byte of the CD-ROM block that is being corrected. Due to the DRAM page organization of one embodiment of the controller, the value of PTH,PTL will always be 00,00h, making it unnecessary to read or write PTL or PTH. The starting location of each block is controlled by write block counter registers WBKL and WBKH (28h and 29h). Error correction is processed on the block before that indicated in the write block counter (WBKH,WBKL−1). The controller organizes the DRAM into 2048-byte pages, allowing PTL and PTH to remain unchanged. PTL and PTH are undefined following hardware reset or firmware reset.

WAL and WAH (Write Address Counter) form a 16-bit counter used by the write buffering logic. At the end of each data sync, WAH, WAL are automatically set to 00,00h. Following each word (two bytes) of write buffering into the external RAM, WAL and WAH are automatically incremented by two. Due to the DRAM page organization of the controller, WAL and WAH control the write location within each CD-ROM block, and are always set to 00,00h after each data sync. The starting location of each block is controlled by write block counter registers WBKL and WBKH (28h and 29h). It is not necessary to read or write WAL or WAH, except for debugging purposes. Because WAL and WAH are automatically incremented whenever control bits DECEN and WRRQ are enabled in register CTRL0 (0Ah.7 and 0Ah.2), WRRQ should be disabled before reading the write address counter. WAH, WAL are cleared to 00,00h by hardware reset or firmware reset.

FIG. 22 is a description of WAL/CTRL0 (Control-0 Register). This register provides control of the ECC and write buffering logic.

DECEN—bit 7—Decoder Enable "1" enables the decoding functions, allowing control bits E01RQ, AUTORQ, WRRQ, QRQ, and PRQ to control the ECC and write buffering logic. "0" disables the decoding functions, overriding control bits E01RQ, AUTORQ, WRRQ, QRQ, and PRQ. Changes to DECEN control the CD-ROM blocks following the next data sync. DECEN is cleared to 0 by hardware reset or firmware reset.

E01RQ—bit 5—Error Detect and Correct Request "1" enables the error correction and detection (ECC and EDC) logic to process the following CD-ROM blocks, according to the settings of QRQ and PRQ. "0" disables the ECC and EDC logic. Changes to E01RQ control the CD-ROM blocks following the next data sync. If both QRQ and PRQ are enabled, the ECC/EDC sequence is Q-codewords, P-codewords, EDC-codeword. If QRQ is enabled but PRQ is disabled, the sequence is Q-codeword, EDC-codeword. If QRQ is disabled but PRQ is enabled, the sequence is P-codeword, EDC-codeword. If both QRQ and PRQ are disabled, only the EDC-codeword is checked. Normally, QRQ and PRQ are enabled whenever E01RQ is enabled in order to provide maximum correction capability. E01RQ is cleared to 0 by hardware reset or firmware reset.

AUTORQ—bit 4—Automatic Correction Request "1" enables automatic error correction for mode 2 CD-ROM blocks, according to the setting of the FORM bit in the Subheader byte of each block. "0" disables automatic error correction for mode 2 CD-ROM blocks. In this case, error correction for mode 2 blocks is controlled by control bit FORMRQ in register CTRLI (0Bh.2). Changes to AUTORQ control the CD-ROM blocks following the next data sync. AUTORQ does not control error correction in mode 1. AUTORQ is cleared to 0 by hardware reset or firmware reset.

WRRQ—bit 2—Write Buffer Request "1" enables writes of incoming serial data to the external buffer RAM automatically incremented when writes are enabled. "0" disables writes of incoming serial data to the external buffer DRAM.

If control bit SWEN is enabled in register CTRLW (10h.6), changes to WRRQ control writes following the next data sync. If SWEN is disabled, changes to WRRQ control writes immediately. Both WRRQ and SWEN are cleared to 0 by hardware reset or firmware reset.

QRQ—bit I—Q-codeword Correction Request "1" enables error correction of Q-codewords, allowing one error to be located and corrected within each Q-codeword. "0" disables error correction of Q-codewords. Changes to QRQ control the CD-ROM blocks following the next data sync. QRQ is cleared to 0 by hardware reset or firmware reset.

PRQ—bit 0—P-codeword Correction Request "1" enables error correction of P-codewords, allowing one error to be located and corrected within each P-codeword. "0" disables error correction of P-codewords. Changes to PRQ control the CD-ROM blocks following the next data sync. PRQ is cleared to 0 by hardware reset or firmware reset.

FIG. 23 is a description of CTRL0 DECODER OPERATION TABLE. NOTE: For repeated correction, see the description of register CRTRG (11h). For buffered-disk-monitor, see the description of control bit ROWEN in register CTRLW (10h.7).

FIG. 24 is a description of CTRL1 (Control–1 Register). This register provides control of the ECC and data sync logic.

SYIEN—bit 7—Sync Insertion Enable "1" enables sync insertion, allowing the internal sync counter to provide timing if the block sync pattern in the incoming serial data contains errors. "0" disables sync insertion. By enabling both SYIEN and SYDEN, the internal sync counter can automatically provide timing if the sync pattern contains errors, and also re-synchronize whenever a new sync pattern is detected. SYIEN is cleared to 0 by hardware reset or firmware reset.

SYDEN—bit 6—Sync Detection Enable "1" enables sync detection, allowing the internal sync counter to re-synchronize whenever a block sync pattern is detected in the incoming serial data. "0" disables sync detection. SYDEN is cleared to 0 by hardware reset or firmware reset.

DSCREN—bit 5—Descrambler Enable "1" enables the CD-ROM data descrambler. "0" disables the CD-ROM data descrambler. Disabling the descrambler is useful for reading uncompressed (Red Book) audio, or for debugging. Changes to DSCREN control the descrambler immediately. DSCREN is cleared to 0 by hardware reset or firmware reset.

COWREN—bit 4—Correction Write Enable "1" enables bytes corrected by the ECC logic to be written to the external RAM. "0" disables bytes corrected by the ECC logic to be written to the RAM. By disabling COWREN, flags CRCOK and CBLK in registers STAT0 (0Ch.7) and STAT3 (0Fh.5) can be used to determine disk error rates. Changes to COWREN control the CD-ROM blocks following the next data sync. COWREN is cleared to 0 by hardware reset or firmware reset.

MODRQ—bit 3—Mode Request "1" sets the error correction mode used by the ECC logic to mode 2. "0" sets the error correction mode used by the ECC logic to mode 1. After determining the mode from the incoming serial data, control bit MODRQ must be set by the microcontroller. The raw mode data from the headers of the incoming serial data should be read from bits RMOD3–0 in register STAT2 (0Eh.7–4). If MODRQ is not set properly, the ECC logic will mis-correct. Note that operation of a mode 2 disk with mode 1 correction causes the header bytes to be erased. MODRQ is cleared to 0 by hardware reset or firmware reset. Generation of checkbytes during the authoring of CD-ROM disks includes ECC coverage of the header bytes for mode 1 blocks, but not for mode 2 blocks. Consequently, the mode byte in a mode 2 disk is not corrected. Mode changes are separated by pre-gap and post-gap blocks and track numbers. Changes to MODRQ control the CD-ROM blocks following the next data sync. MODRQ is cleared to 0 by hardware reset or firmware reset.

FORMRQ—bit 2—Form Request "1" sets the form to 2, disabling the mode 2 ECC logic (but EDC is enabled). "0" sets the form to 1, enabling the mode 2 ECC logic. If control bit AUTORQ is enabled in register CTRL0 (0Ah.4), the setting of FORMRQ is not used by the ECC logic. FORMRQ is not used by the ECC logic if mode 1 is selected (control bit MODRQ set to 0 in register CTRL0). Changes to FORMRQ control the CD-ROM blocks following the next data sync. FORMRQ is cleared to 0 by hardware reset or firmware reset.

MBCKRQ—bit 1—Mode Byte Check Request "1" enables checking of the mode byte. "0" disables checking of the mode byte. While checking of the mode byte is enabled, if the mode in the header of the incoming serial data does not match that selected by control bit MODRQ, ECC is disabled for the block and the NOCOR flag is set in register STAT0 (0Ch.5). Changes to MBCKRQ control the CD-ROM blocks following the next data sync. MBCKRQ is cleared to 0 by hardware reset or firmware reset.

SHDREN—bit 0—Subheader Read Enable "1" selects subheader bytes to be provided by registers HEAD0–3 (04h–07h). "0" selects header bytes to be provided by registers HEAD0–3. By setting SHDREN high, HEAD0–3 can be used to provide subheader bytes instead of header bytes. However, it is more convenient to read the subheader from registers SUBH0–3 (14h–17h), which are not controlled by SHDREN. Changes to SHDREN control reads of HEAD0–3 immediately. SHDREN is cleared to 0 by hardware reset or firmware reset.

FIG. 25 is a description of STAT0 (Status0 Register). This register provides status of the ECC, write buffering, and data sync logic.

CRCOK—bit 7—Cyclic Redundancy Check OK. Flag CRCOK can become active-high only if the error detection (EDC) logic is enabled. This occurs automatically if correction or write-only decoder operations are selected (see the CTRL0 Operation Table) and "1" indicates that the cyclic redundancy check passed during the last ECC/EDC sequence. "0" indicates that the cyclic redundancy check failed during the last ECC/EDC sequence. Flag CRCOK becomes valid when flag DECIb in register IFSTAT (01h.5) changes to active-low, and remains valid until the next block sync. See the description of flag VALSTb in register STAT3 (0Fh.7) to determine timing of the next sync. CRCOK is cleared to 0 by hardware reset or firmware reset.

ILSYNC—bit 6—Illegal Sync flag can become active-high only if sync detection is enabled by control bit SYDEN in register CTRL1 (0Bh.6). In this case, occurrence of illegal sync re-synchronizes the internal sync counter. "1" indicates that a sync pattern was detected earlier than expected (less than 2352 bytes after the last detected or inserted sync). "0" indicates that no early sync pattern was detected. Flag ILSYNC becomes valid when flag DECIb in register IFSTAT (01h.5) changes to active-low, and remains valid until the next block sync. ILSYNC is cleared to 0 by hardware reset or firmware reset.

NOSYNC—bit 5—No Sync flag can become active-high only if sync insertion is enabled by control bit SYIEN in register CTRL1 (0Bh.7). In this case, the internal sync counter will provide timing when the sync pattern is missing or has errors. "1" indicates that a sync pattern was not detected when expected (expected sync to occur 2352 bytes after the last detected or inserted sync). "0" indicates that a sync pattern was detected when expected. Flag NOSYNC becomes valid when flag DECIB in register IFSTAT (01h.5) changes to active-low, and remains valid until the next block sync. NOSYNC is cleared to 0 by hardware reset or firmware reset.

LBLK—bit 4—Long Block flag can become active-high only if sync insertion is disabled by control bit SYIEN in register CTRL 1 (0Bh.7). In this case, the internal sync counter will not provide timing when the sync pattern is missing or has errors. However, only 2352 bytes of incoming serial data will be written to the external RAM. "1" indicates that a sync pattern was not detected when expected (expected sync to occur 2352 bytes after the last detected sync). "0" indicates that a sync pattern was detected when expected. Flag LBLK becomes valid when flag DECIb in register IFSTAT (01h.5) changes to active-low, and remains valid until the next block sync. LBLK is cleared to 0 by hardware reset or firmware reset.

WSHORT—bit 3—Word Short "1" indicates that the incoming serial data rate exceeds the capability of the write buffering logic. "0" indicates that the incoming serial data rate was OK. The WSHORT error flag becomes valid immediately after the excessive rate is detected. This error is usually caused by hardware problems, and must be corrected for proper controller operation. WSHORT is cleared to 0 by hardware reset or firmware reset.

SBLK—bit 2—Short Block flag can become active-high only if sync detection is disabled by control bit SYDEN in register CTRLI (0Bh.6). In this case, occurrence of illegal sync will not re-synchronize the internal sync counter. "1" indicates that a sync pattern was detected earlier than expected (less than 2352 bytes after the last inserted sync). "0" indicates that no early sync pattern was detected. Flag SBLK becomes valid when flag DECIb in register IFSTAT (01h.5) changes to active-low, and remains valid until the next block sync. SBLK is cleared to 0 by hardware reset or firmware reset.

UCEBLK—bit 0—Uncorrectable Errors in Block flag can become active-high only if the error correction (ECC) logic is enabled (Q-P, Q, or P-correction decoder operation selected). "1" indicates that one or more error bytes could not be corrected during the last ECC sequence. "0" indicates that no error bytes remained after the last ECC sequence. Flag UCEBLK becomes valid when flag DECIB in register IFSTAT (01h.5) changes to active-low, and remains valid until the next block sync. UCEBLK is cleared to 0 by hardware reset or firmware reset.

FIG. 26 is a description of STAT0 BLOCK SYNC STATUS TABLE.

FIG. 27 is a description of SSTAT1 (Status-1) register. This register provides erasure flags for the header and subheader bytes of the CD-ROM block. The erasure flags are provided through input pin C2PO.

HDERA—bit 4—Header Erasure "1" indicates that the erasure flag was set for one or more header bytes. "0" indicates that no erasure flags were set for the header bytes.

SHDERA—bit 0—Subheader Erasure "1" indicates that the erasure flag was set for both bytes in one or more subheader byte-pairs. "0" indicates that no erasure flags were set for both bytes in the subheader byte-pairs. During disk-monitor operation (see the description of register CTRL0), erasures are read directly from incoming C2PO flags. If the incoming serial data (from pin DSTATA) is buffered, the incoming C2PO flags are held and become available in STAT1 one block later, matching the one block delay of the buffered header and subheaders. In either case, HDERA and SHDERA become valid when flag DECIb in register IFSTAT (01h.5) changes to active-low, and remain valid until the next block sync.

FIG. 28 is a description of STAT2 (Status-2) register. This register provides mode and form information of the CD-ROM block.

FIG. 29 is a description of STAT2 RMODE TABLE. RMOD3–RMOD0—bits 7–4—Raw Mode provide mode information from the incoming serial data, during both buffer RAM and disk-monitor operation. Because RMOD3–RMOD0 cannot be changed by the ECC logic, they should be used for determining the mode of the CD-ROM block, according to the figure. N can be any number between 1 and 1 Fh. RMOD3–RMOD0 become valid when flag DECIb in register IFSTAT (01h.5) changes to active-low, and remain valid until the next block sync. RMOD3–RMOD0 are cleared to 0 by hardware reset or firmware reset.

MODE—bit 3—Selected Mode flag provides the value of bit MODRQ in register CTRL1 (0Bh.3). "1" indicates that bit MODRQ is set high (mode-2 selected). "0" indicates that bit MODRQ is set low (mode-1 selected). Flag MODE becomes valid when flag DECIb in register IFSTAT (01h.5) changes to active-low, and remains valid until the next block sync. Flag MODE is cleared to 0 by hardware reset or firmware reset.

NOCOR—bit 2—No Correction flag indicates whether error correction was performed NOCOR is valid only if control bit E01RQ, and QRQ or PRQ, are enabled in register CTRL0 (0Ah.5, 0Ah.1, 0Ah.0). "1" indicates that the last ECC/EDC sequence was aborted. "0" indicates that the last ECC/EDC sequence completed. The ECC/EDC sequence is aborted, and flag NOCOR set high, for the following reasons: Mode mismatch or erasure detected while control bit MBCKRQ is enabled in register CTRL1 (0Bh.1): A mode mismatch occurs if the mode in the header of the incoming serial data does not match that selected by control bit MODRQ in register CTRL1 (0Bh.3). A mode erasure occurs if the incoming C2PO flag is set for the fourth header byte, indicating unreliable mode data. Form 2 enabled while ECC logic is set to mode 2: Form 2 blocks cannot be corrected. Form 2 can be enabled by control bit FORMRQ in register CTRL1 (0Bh.2), or by the FORM bit in the Subheader byte if control bit AUTORQ is enabled in register CTRL0 (0Ah.4). FORM bit erasures while ECC logic is set to mode 2 and AUTORQ is enabled: A form bit erasure is detected if the incoming C2PO flags are set for both FORM bits in the Subheader bytes. Illegal sync occurs while control bit SYDEN is enabled in register CTRL1 (0Bh.6), indicating that a sync pattern was detected earlier than expected. Control bit COWREN set low in register CTRL1 (0Bh.4). Flag NOCOR becomes valid when flag DECIb in register IFSTAT (01h.5) changes to active-low, and remains valid until the next block sync. Flag NOCOR is cleared to 0 by hardware reset or firmware reset.

RFORM 1—bit 1—Raw Form Erasure "1" indicates that a form bit erasure was detected (a form bit erasure is detected if the incoming C2PO flags are set for both FORM bits in the Subheader bytes. "0" indicates that a form bit erasure was not detected. RFORM1 becomes valid when flag DECIb in register IFSTAT (01h.5) changes to active-low, and remains valid until the next block sync. RFORM1 is cleared to 0 by hardware reset or firmware reset.

RFORM0—bit 0—Raw Form Bit "1" indicates that the FORM bit was high in the Subheader bytes of the incoming serial data. "0" indicates that the FORM bit was low in the Subheader bytes of the incoming serial data. RFORM0 becomes valid when flag DECIb in register IFSTAT (01h.5) changes to active-low, and remains valid until the next block sync. RFORM0 is cleared to 0 by hardware reset or firmware reset.

UNUSED (0Eh-write) SBOUT is not useful for ATAPI. Address 0Eh should not be written to.

FIG. 30 is a description of STAT3/RESET (Status-3) register. This register provides status of the ECC logic.

Reading STAT3 clears flag DECIb to 1 in register IFSTAT (01[b]h.6), and clears any active decoder interrupt.

VALSTb—bit 7—Valid Status flag indicates the valid period during which the following header, pointer, and status registers can be read by the microcontroller: HEAD0–3 (04h–07h), PTL and PTH (08h–09h), STAT0–3 (0Ch–0Fh), SUBH0–3 (14h-17h), and WBKL and WBKH (28h and 29h). "1" indicates that the header, pointer, and status registers contain valid data, and are ready to be read. "0" indicates that the header, pointer, and status registers are not valid. Flag VALSTb becomes active-low when flag DECIb (decoder interrupt) in register IFSTAT (01h.5) changes to active-low, and returns?high when the next block sync occurs (detected or inserted). Reading STAT3 does not change VALSTb. VALSTb is cleared to 1 by hardware reset or firmware reset.

CBLK—bit 5—Corrected Block flag is valid only if the error correction (ECC) logic is enabled (Q-P,Q, or P-correction decoder operation selected). "1" indicates that one or more error bytes were corrected during the last ECC sequence. "0" indicates that no bytes were corrected during the last ECC sequence. Flag CBLK becomes valid when flag DECIb in register IFSTAT (01h.5) changes to active-low, and remains valid until the next block sync. CBLK is cleared to 0 by hardware reset, firmware reset, or by disabling WRRQ in register CTRL0 (0Ah.2).

RESET (Firmware Reset) activates firmware reset. Firmware reset clears most of the controller logic. However, to avoid disturbing important logic, firmware reset does not clear certain functions. The following list shows the differences between hardware reset (which clears all of the controller functions) and firmware reset. Functions NOT cleared by firmware reset: Clock stop logic controlled by input pin CLKSTP, register XTAL (1Ah) and output pin MCK, register DSPSL (1Bh), flag CS13 of register HDDIR (1Fh.6), register HICTL, register SUBC2 (21h), register RAMCF (2Ah), register MEMCF (2Bh), register SUBCD (2Ch), register UMISC (2Eh), register RSSTAT flags SRST, CMD, DIAGCMD, PARINT, RST, URST, and HRST (2Fh.7–5,3–0), R/W bit DRV in register ATDRS (36h and control bits SRST and nIEN in the ATAPI Device Control Register. Flag URST of register RSSTAT (2Fh.1) is set by firmware reset (see description of register RSSTAT).

FIG. 31 is a description of CTRLW (Control-Write) register. This register provides control of the write buffering logic. CTRLW bits 7, 3, 2, 1 and 0 should always be cleared to 0.

SWEN—bit 6—Synchronized Write Enable "1" enables synchronized write enable, causing changes by control bit WRRQ (0Ah.2) to be delayed until the end of the next block sync. "0" disables synchronized write enable. Selecting synchronized write enable causes the writing of incoming serial data to the buffer RAM to start or stop at the end of the next block sync. This prevents the writing of partial blocks into the RAM. SWEN should be changed only during decoder initialization. Write enable and disable is still controlled by bit WRRQ in register CTRL0 (0Ah.2). SWEN synchronizes changes in WRRQ to the end of sync, instead of randomly. SWEN is cleared to 0 by hardware reset or firmware reset.

SDSS—bit 5—Subcode-DSP Sync Synchronization "1" enables subcode-DSP sync synchronization, causing audio write enables by control bit WRRQ (0Ah.2) to be delayed until the first left-channel lower-byte following the end of the subcode block. "0" disables subcode-DSP sync synchronization. Selecting Subcode-DSP Sync Synchronization causes the writing of incoming serial audio (red book) to the buffer RAM to start at the first left-channel lower-byte following the end of the subcode block. This prevents separate decoder and subcode interrupts from occurring. SDSS should be changed only during decoder initialization. Write enable and disable is still controlled by bit WRRQ in register CTRL0 (0Ah.2). SDSS synchronizes changes in WRRQ to the subcode block, instead of randomly. SDSS is cleared to 0 by hardware reset or firmware reset.

DCLKE—bit 4—DSP Clock Enable "1" enables the incoming clock from the DSP. "0" disables the incoming clock from the DSP. DCLKE should be set high whenever DECEN in register CTRL0 is set high.

FIG. 32 is a description of CRTRG (Correction Retry Trigger) Writing 00h or 01h to register CRTRG triggers an error-correction retry.

CRTRL—bit 0—Correction Retry Register Load "1" loads any updated E01RQ, QRQ, or PRQ values that have been written to register CTRL0 (0Ah.5,1,0) into the ECC sequencer, allowing the correction sequence to be changed. "0" does not load updated E01RQ, QRQ, or PRQ values into the ECC sequencer. Instead, the sequence of the last correction try is repeated.

FIGS. 33 through 38 are descriptions of SUBH0 to SUBH3 (Subheader Registers). These registers provide the subheader of each CD-ROM block, and operate similarly to header registers HEAD0–3. If control bit DECEN in register CTRL0 (0Ah.7) is enabled, data from the four pairs of bytes following each header (bytes 16–23) is automatically stored in the subheader registers (SUBH0–3). Bytes 16–23 are stored regardless of the setting of control bit MODRQ in register CTRL1 (0Bh.3), but the bytes contain subheader data only if mode 2 is selected (MODRQ=1). During disk-monitor operation (see the description of register CTRL0), uncorrected subheader bytes are taken directly from incoming serial data. If the incoming serial data is buffered, subheader bytes are taken from the buffer RAM, and are corrected if form 1 (mode 2) is selected and ECC is enabled. In either case, SUBH0–3 should be read soon after the decoder interrupt occurs (bit DECIb in register IFSTAT becomes 0). SUBH0–3 remains valid until the next sync occurs (see the description of register STAT3 for checking the valid time period). The following figure shows the relationship between erasure flags and the byte numbers that are stored in SUBH0–3 (erasure flags are provided through input pin C2PO.

FIG. 39 is a description of Subheader Byte Number Table. SLBH0–3 are undefined following hardware reset or firmware reset.

FIG. 40 is a description of VER (Version) register. VER contains the version identification of the device. This register permits expansion and increased performance capabilities for future versions of the controller. VER is not changed by hardware reset or firmware reset.

XTAL (Xtal) register provides control of the crystal frequency dividers.

MCK1—bit 3—Pin MCK 1×"1" sets the clock output at pin MCK to the crystal frequency (no divider). "0" sets the clock output at pin MCK to ½ crystal frequency. MCK1 is cleared to 0 by hardware reset, but is not changed by firmware reset.

XTALD2—bit 0—Crystal Divided by 2"1" sets the internal controller clock to ½ crystal frequency. "0" sets the internal clock to the crystal frequency (no divider). XTALD2 is cleared to 0 by hardware reset, but is not changed by firmware reset.

FIG. 41 is a description of DSPSL (DSP Selection) register. This register selects the DSP configuration.

C2ML—bit 7—C2 MSB to LSB "1" sets the direction of incoming erasures at pin C2PO to upper erasure followed by lower erasure. "0" sets the direction to lower erasure followed by upper erasure. C2ML is cleared to "0" by hardware reset, but is not changed by firmware reset.

SEL16O—bit 6—Select 16 Offset "1" selects 16 bit-clocks per channel, with offset by one after LRCK. "0" does not select 16 bit-clocks with offset. SEL16O is cleared to "0" by hardware reset, but it is not changed by firmware reset.

LCHL—bit 5—Left Channel Polarity "1" selects left channel as active if pin LRCK is "1" "0" selects left channel is active if pin LRCK is "0". LCHO is set to "1" by hardware reset, but is not changed by firmware reset.

SEL16—bit 2—Select 16 "1" selects 16 bit-clocks per channel. "0" does not select 16 bit-clocks. SEL16 is set to "1" by hardware reset, but is not hanged by firmware reset.

DIR—bit 1—Data Direction "1" selects the rising edge of DBCK for latching incoming data at pin DSDATA. "0" selects the falling edge of DBCK for latching DSDATA. If the incoming data at pin DSDATA changes at the falling edge of DDBCK, use the rising edge for latching if DSDATA changes at the rising edge of DBCK, use the falling edge for latching. EDGE is set to 1 by hardware reset, but is not chanted by firmware reset.

FIG. 42 DSP SELECTION TABLE shows the settings for various DSPs. The default setting after hardware reset is 00100101 (Matsushita MN66261). The setting of DSPSL is not changed by firmware reset.

FIG. 43 is a description of the HCON/UACL register.

FIG. 44 is a description of the DSPSL register.

FIGS. 45, 46 and 47 are descriptions of the UACL, UACH and UACU Microcontroller-RAM Address Counter which forms a 20-bit counter that controls the buffer address for transfers between the microcontroller and RAM. The counter can be set to any physical location in the buffer RAM, and contains enough bits to support larger RAM sizes in future revisions. After waiting for busy flag URTBSY to be low in register HDDIR (1Fh.7), the microcontroller writes the RAM starting address into the counter. UACL, UACH, and UACU are incremented automatically each time a byte is read or written. See the description of registers RAMRD, (1Eh), RAMWR (1Eh), and flag LRTBSY in register HDDIR (1Fh.7). UACH should always be written after UACL is written, and UACU should always be written after UACH is written. UACL, UACH and UACU are undefined following hardware reset or firmware reset.

FIG. 48 is a description of the RAMRD/RAMWR RAM Read and Write registers. The microcontroller accesses the buffer RAM by reading from the RAMRD register or writing to the RAMWR register. To initialize a read or write sequence, the microcontroller waits for busy flag URTBSY to be low in register HDDIR (1Fh.7), then writes the RAM starting address into the counter formed by UACL (1 Ch), UACH (1Dh), and UACU (2Dh). Reading RAMRD causes events (1), (2) and (3) to occur in the following order: (1)—data previously stored in RAMRD is transferred to the microcontroller; (2)—RAM data at the counter address is transferred to the RAMRD register; and (3) counter UACL, UACH, and UACU is incremented and flag URTBSY cleared. After the RAM starting address is written to the counter, the first read of register RAMRD will transfer an INVALID byte to the microcontroller, followed by the starting byte from the RAM to the RAMRD register. The invalid byte remains from a previous access, or from power-up. Because the counter is automatically incremented, sequential reads can be used without writing new addresses into UACL, UACH, and UACU. However, flag URTBSY should be checked before each sequential read from RAMRD to make sure that events (1), (2) and (3) in the previous transfer from RAM to RAMRD have completed.

Writing RAMWR causes the following events to occur in the following order: (1)—data is transferred from the microcontroller to register RAMWR; (2)—data is transferred from RAMWR to the RAM (at the counter address); and (3)—counter UACL, UACH and UACU is incremented and flag URTBSY is cleared. After the RAM starting address is written to the counter, the first write to register RAMWR will transfer a VALID byte to the RAM. Because the counter is automatically incremented, sequential writes can be used without writing new addresses into UACL, UACH and UACU. However, flag URTBSY should be checked before each sequential write to RAMWR to make sure that events (1)–(3) in the previous transfer from RAMWR to RAM have completed. The contents or RAMRD and RAMWR are undefined following hardware reset or firmware reset.

FIG. 49 is a description of HDDIR Host data Direction Register. This register provides microcontroller and host transfer flags and control.

URTBSY—read bit 7—Microcontroller to RAM Transfer Busy "1" indicates that the previous microcontroller-RAM transfer is in progress. "0" indicates that the microcontroller-RAM transfer logic is not busy. URTBSY is cleared to 0 by hardware reset or firmware reset.

CS13—read bit 6 Chip Select 1 and 3 "1" indicates that input pins CS 1FX- and CS3FX-became active at the same time, indicating present of a non-ATA host adaptor. "0" indicates normal operation. Flag CS13 can be used to support non-ATA host adapters that have lines CS1 FX- and CS3FX-connected together. With this adaptor configuration, host writes to the ATAPI Features Register (1F1) will set flag CS13, allowing firmware to respond appropriately to adapters that do not support separate CS3FX-addressing. CS13 is cleared to 0 by hardware reset, but is not changed by firmware reset.

UDTRG and UDATA—write bits 7 and 6—Microcontroller Data Trigger/Select are normally set to "0", selecting data transfers from the buffer RAM to the host. Setting UDATA to "1" enables microcontroller writes to data registers UDTA0–7 (40h–47h), and allows high-speed 8-bit or 16-bit data transfers from UDTA0–7 to the host. Writing to UDTRG triggers the transfer from UDTA0–7 to the host. This type of transfer is efficient for the small amounts of data (up to eight bytes can be transferred at a time). Registers IFSTAT, IFCTRL, DBCL, DBCH, DTTRG, and DTACK (01h–03h, 06h and 07h) are used in the same way as a RAM to host transfer, except flag DTENb in IFSTAT has no meaning. However, registers DACL and DACH are not used. After enabling control bit DOUTEN (in register IFCTRL), loading DBCL, DBCH and setting UDATA to 1, and writing to registers UDTA0–7, the microcontroller writes to register DTTRG. Next, the microcontroller sets UDTRG to 1, followed by 0, to trigger the FIFO-ready transfer logic. The host will receive data beginning with UDTA0 and ending with UDTA7. UDTRG and UDATA are cleared to 0 by hardware reset or firmware reset.

HOST16—write bit 5—Host 16-bit Select "1" selects 16-bit Data reads and Packet FIFO writes (at host register 1F0h). "0" selects 8-bit Data reads and packet-FIFO writes because 8-bit data transfers do not conform to the ATAPI specification, HOST16 should normally be set to 1. HOST16 is cleared to 0 by hardware reset or firmware reset. Note: For 16-bit data reads, the number of WORDS minus one should be loaded into DBCL and DBCH. For 8-bit data reads, the number of BYTES minus one should be loaded into DBCL and DBCH.

FIG. 50 is a list of the only values that should be written to HDDIR—write bits 4, 3, 2, 1 and 0, following hardware or firmware reset.

FIG. 51 is a description of the HICTL Host Interface Control register. This register provides control of the host interface.

HICTL—bit 7 should only be set to "0". This bit is cleared to 0 by hardware reset but is not changed by firmware reset.

PDIAGEN—bit 6—Pin HPDIAG- Enable "1" sets pin HPDIAG- to the active-low state. "0" clears HPDIAG- to the high-impedance state (HPDIAG- is an open-drain pin). PDIAGEN is automatically cleared to 0, clearing pin HPDIAG- to high-impedance by hardware reset command Execute Drive Diagnostics (ATA opcode 90h), or ATA Soft Reset (SRST). After PDIAGEN is automatically cleared, pin HPDIAG- should be set following the timing in ATAPI and ATA specification. Execute Drive Diagnostics and ATA Soft Reset clear PDIAGEN even if the drive is not selected in the ATAPI Drive Select Register. PDIAGEN is not changed by firmware reset.

DASPEN—bit 5—Pin HDASP- Enable "1" sets pin HDASP- to the active-low state. "0" clears HDASP- to the high-impedance state (HDASP- is an open drain pin). DASPEN is automatically cleared to 0, clearing pin HDASP- to high-impedance by hardware reset command Execute Drive Diagnostics (ATA opcode 90h), or ATA Soft Reset (SRST). After DASPEN is automatically cleared, pin HDASP- should be set following the timing in ATAPI and ATA specification. Execute Drive Diagnostics and ATA Soft Reset clear DASPEN even if the drive is not selected in the ATAPI Drive Select Register. DASPEN is not changed by firmware reset.

CLRBSY—bit 4—Clear BSY "1" prepares the clearing logic for flag BSY in the ATAPI Status Register. Note: BSY is actually cleared by the FOLLOWING write to register HICTL. "0" should be written to CLRBSY during the FOLLOWING write. Whenever flag BSY in the ATAPI Status Register (1F7h) is set, whether automatically or by control bit SETBSY, BSY should be cleared (using CLRBSY) as soon as allowed by the ATAPI and ATA specifications. See the description of control bit SETBSY. CLRBSY is not changed by firmware reset.

SETBSY—bit 3—Set BSY "1" prepares the setting logic for flag BSY in the ATAPI Status Register. Note: BSY is actually set by the FOLLOWING write to register HICTL. "0" should be written to SETBSY during the FOLLOWING write. Writing 1 to SETBSY activates the microcontroller interrupt, if enabled by control bit IDEIEN in register UMISC (2Eh.7). Flag BSY is automatically set, and the microcontroller interrupt activated, by hardware reset, command Execute Drive Diagnostics (ATA opcode 90h), ATA Soft Reset (SRST), or any command written to the ATAPI Command Register (host register 1F7h). SETBSY and flag BSY are not changed by firmware reset.

SCOD—bit 2—Select command Packet or Data "1" selects the Command-Packet FIFO to be addressed by the ATA data port (host address 1F0h). "0" selects the buffer RAM to be addressed by the ATA data port. SCOD is cleared to 0 by hardware reset, but is not changed by firmware reset.

IORDYEN—bit 1—Pin IORDY Enable "1" allows the data transfer logic to de-assert pin IORDY whenever necessary. "0" does not allow IORDY to be de-asserted IORDY acts as an open-drain pin). If IORDYEN is set high, pin IORDY will be de-asserted to 0 whenever it is necessary to slow down the data transfer rate to match the capability of the CD-ROM drive. The capability of the drive depends on the RAM configuration and crystal frequency. Note Some systems will not work properly if pin IORDY is de-asserted IORDYEN is set to 1 by hardware reset but is not changed by firmware reset.

IOCS 16EN—bit 0 Pin IOCS 16- Enable "1" allows pin IOCS 16- to become active low during 16-bit reads from the buffer RAM or 16-bit writes to the Packet FIFO (at host register 1F0h). Note: Control bit HOST16 in register HDDIR (1Fh.5) must also be enabled. "0" does not allow IOCS16- to be asserted (IOCS16- is an open drain pin). Because both IOCS 16EN and HOST16 must be enabled to allow assertion of pin IOCS 16-, IOCS 16EN can always be set to 1. In this case, HOST16 will correctly control pin IOCS16- and all 16-bit transfer logic. To conform to the ATAPI specification, 16-bit data transfers should be used. IOCS16EN is cleared to 0 by hardware reset, but is not changed by firmware reset.

FIG. 52 is a description of SUBC2 Subcode Control-2 register. This register provides control of the subcode interface.

NOPQ—bit 3 No P-data or Q-data, "1" clears (to 0) bits 7 and 6 (P-data and Q-data) of subcode data that is written to the buffer RM. "0" allows the P-data and Q-data bits to be included in subcode data that is written to the buffer RAM. NOPQ is cleared to 0 by hardware reset, but is not changed by firmware reset.

FIG. 53 is a description of the DSP Subcode Clock TABLE.

CDSP2, CDSP1, and CDSP0-bits 2, 1 and 0—DSP Subcode Clock Select, if subcode is buffered the DSP clock select bits must be set as shown in the figure, in order to match the subcode data rate. Only the combinations shown in the table should be used. DSP2–0 only control subcode clocking logic, and do not need to be set unless subcode is written to the buffer RAM. CDSP2–0 are cleared to 0 by hardware reset, but are not changed by firmware reset.

FIG. 54 is the STATS Status of subcode register. If read from, STATS provides status of the subcode interface. If written to, STATS clears the subcode interrupt (if enabled) and status flags.

STATS bits 7, 6, 5, 4 and 3 are undefined. During reads of STATS by the microcontroller, bits 7–3 are undefined, and can be high or low.

MISSY—bit 2—Missing Subcode Sync "1" indicates a missing subcode sync condition. "0" indicates subcode sync is not missing. Flag SINT in register RSSTAT (2Fh.4) is set (to 1) whenever flag MISSY is set. If enabled by control bit SCIEN in register SUBCD (2Ch.4), a microcontroller interrupt is also activated when MISSY is set. SINT, interrupt, and MISSY are cleared by writing any value to STATS.

SBKEND—bit 1—Normal End of Subcode Block "1" indicates a normal subcode block end. "0" indicates no normal subcode block end. Flag SINT in register RSSTAT (2Fh.4) is set (to 1) whenever flag SBKEND is set. If enabled by control bit SCIEN in register SUBCD (2Ch.4), a microcontroller interrupt is also activated when SBKEND is set. SINT, interrupt, and SBKEND are cleared by writing any value to STATS.

SILSY—bit 0—Illegal Subcode Sync "1" indicates a normal subcode block end. "0" indicates no normal subcode block end. Flag SINT in register RSSTAT (2Fh.4) is set (to 1) whenever flag SILSY is set. If enabled by control bit SCIEN in register SUBCD (2Ch.4), a microcontroller interrupt is also activated when SILSY is set. SINT, interrupt, and SILSY are cleared by writing any value to STATS.

FIGS. 55 and 56 are descriptions of DBACL and DBACH Data Transfer Block Registers. In order to free the microcontroller from calculating 2352-byte address boundaries, the buffer RAM is partitioned into blocks. Registers DBACL and DBACH control the RAM block number of the data to be transferred, while counters DACL and DACH (04*h* and 05*h*) control the address relative to the beginning of the RAM block specified by DBACL and DBACH. The RAM block number is not incremented automatically, and must be set before each block transfer to the host begins. DBACL and DBACH contain enough bits to support larger RAM sizes in future revisions. For data transfer information, see the description of registers IFCTRL, DBCL, DBCH, a=DACL, DACH DTTRG, and DTACK (01h–07h). DBACH should always be written after DBACL is written. DBACL, DBACH are cleared to 00,00h by hardware reset or firmware reset.

FIGS. 57 and 58 are descriptions of SBKL and SBKH Subcode Write Block Registers. After the appropriate interrupt occurs, registers SBKL and SBKH point to the RAM block number of subcode that is available for transfer to the host. Also, the number in SBKL and SBKH plus 1 points to the RAM block number of the buffer area for writing incoming subcode. Register SBADR (23h) controls the write location within each block. The RAM block number in SBKL and SBKH is incremented automatically, and only needs to be updated by the microcontroller in order to overwrite a discarded block. SBKL and SBKH contain enough bits to support larger RAM sizes in future revisions. If subcode sync and data sync are synchronized by enabling control bit SDSS in register CTRLW (10h.5), SBKL and SBKH should be read soon after the decoder interrupt occurs (bit DEClb in register IFSTAT becomes 0). In this case, SBKL and SBKH remain valid until the next data sync occurs (see the description of register STAT3 for checking the valid time period). If subcode sync and data sync are not synchronized, SBKL and SBKH should be read soon after the subcode interrupt occurs (bit MISSY, SBKEND, or SILSY in register STATS becomes 1). In this case, SBKL and SBKH remain valid until the next subcode interrupt occurs. The value read from the lower 9 bits of SBKL and SBKH during the valid time period identifies the RAM block that is available for transfer to the host. During reads of SBKH by the microcontroller, bits 7-1 are undefined, and can be high or low. SBKH, SBKL are cleared to 00,00h by hardware reset or firmware reset, causing buffering of incoming subcode data to begin at block number 1.

FIGS. 59 and 60 are descriptions of WBKL and WBKH Decoder and Buffer-Write Block Counter registers. In order to free the microcontroller from calculating 2352-byte address boundaries, the buffer RAM is partitioned into blocks. Registers WBKL and WBKH point to the RAM block number of the data to be processed by the error correction logic. Also, the number in WBKL and WBKH plus 1 points to the RAM block number of the buffer area for writing incoming serial data. Registers WAL and WAH (08h/0Ah and 09h/0Bh) control the write location within each RAM block. The RAM block number in WBKL and WBKH is incremented automatically, and only needs to be updated by the microcontroller in order to overwrite a discarded block. WBKL and WBKH contain enough bits to support larger RAM sizes in future revisions. WBKL and WBKH should be read soon after the decoder interrupt occurs (bit DEClb in register IFSTAT becomes 0). WBKL and WBKH remain valid until the next sync occurs (see the description of register STAT3 for checking the valid time period). The value read from the lower 9 bits of WBKL and WBKH during this valid time period identifies the RAM block that is available for transfer to the host. During reads of WBKH by the microcontroller, bits 7–1 are undefined, and can be high or low. WBKH, WBKL are cleared to 00,00h by hardware reset or firmware reset, causing buffering of incoming serial data to begin at block number 1.

FIG. 61 is a description of RAMCF RAM Configuration Register. This register provides control of the RAM interface configuration. Each control bit written to this register can also be read by the microcontroller.

RFTYP—bit 7 Refresh Type "1" selects CAL before RAM DRAM refresh. "0" selects CAS only DRAM refresh. RFTYP is cleared to 0 by hardware reset, but is not changed by firmware reset.

RAMCLR—bit 6—RAM Clear Enable "1" enables RAM clearing, filling all locations in the buffer RAM. "0" disables RAM clearing. To clear the RAM, first write the clear data value (normally 00h) to register RAMWR (1Eh). Next, write 00h to registers UACL, UACU, and UACH (1Ch, 1Dh and 2Dh). Enable RAMCLR to begin writing the contents of RAMWR to each RAM location. When all RAM locations have been filled, RAM0 (bit 5) will change from 0 to 1. After RAM clearing has completed, the microcontroller should clear RAMCLR to 0. RAM0 will return to 0 when RAMCLR is disabled. If enabled by control bit RPEN, the correct parity bit will be written to all locations during RAM clearing. RAMCLR is cleared to 0 by hardware reset, but is not changed by firmware reset.

RAM0—bit 5—RAM Clear Flag (read only) "1" indicates that the RAM address has wrapped around beyond 00,00,00h, and that RAM clearing has completed. "0" indicates that the RAM clearing has not completed or is disabled. RAM0 is cleared to 0 by hardware reset, but is not changed by firmware reset.

UHILO—bit 4—Host High-Low Swap "1" enables byte swaps for reads from the buffer RAM to the host, causing odd bytes to be read before even bytes. "0" disables byte swap, causing even bytes to be read before odd bytes. Byte swapping is not normally needed for ATAPI operation. UHILO is cleared to 0 by hardware reset, but is not changed by firmware reset.

RPEN—bit 3 RAM Parity Enable "1" enables parity checking, and parity interrupt, of DRAM data. "0" disables parity checking and parity interrupt. Enabling RAM parity allows defective DRAMS to be detected. RAM clearing, using control bit RAMCLR, should be completed before RAM parity is enabled. If a parity error is detected, flag PARINT will be set to 1 in register RSSTAT (2Fh.3) and the microcontroller interrupt pin will be activated. Flag PARINT and the interrupt are cleared by clearing RPEN to 0. RPEN is cleared to 0 be hardware reset, but is not changed by firmware reset.

FIG. 62 is a table of RCF2, RCF1 and RCF0—bits 2, 1 and 0—RAM Configuration. Only the settings shown in the RAM Configuration Table should be used. RCF2, RCF1, and RCF0 are cleared to 0 by hardware reset, but are not changed by firmware reset.

FIG. 63 is a description of MEMCF (Memory Layout Configuration) register. This register provides control of the RAM layout configuration.

MEMCF bits 7, 6, 5, and 4 must always be set to 0. MEMCF bits 7, 6, 5, and 4 are cleared to 0 by hardware reset, but are not changed by firmware reset.

PURG—bit 3—Data FIFO Purge "1" purges the RAM to Host Data FIFO. "0" disables the FIFO purge logic. This bit should be cleared to 0 except during the purge operation. PURG is cleared to 0 by hardware reset, but is not changed by firmware reset.

IORDYF—bit 2—Pin IORDY Fast Enable "1" enables output pin IORDY to be de-asserted to 0 without qualification by input pin HRD-. "0" disables unqualified de-assertion of pin IORDY. This bit speeds up de-assertion of pin IORDY by ignoring the state of pin HRD-. However, unqualified de-assertion of IORDY violates the ATA specification, and may interfere with normal operation of many systems. IORDYF is cleared to 0 by hardware reset, but is not changed by firmware reset.

FIG. 64 is a description of MLY1 and MLY0—bits 1 and 0—Memory Layout Configuration. Following hardware reset, the memory layout configuration should be set as shown in the figure. Only the settings shown in the Memory Layout Configuration Table should be used. Normally, all auxiliary blocks are buffered (MLY1=1 and MLY0=1). If only the last 2 auxiliary blocks are buffered, the configuration must be changed whenever data transfer sizes above 2048 bytes are required. MLY1 and MLY0 ARE CLEARED TO 0 BY HARDWARE RESET, but are not changed by firmware reset.

FIG. 65 is a description of SUBCD Subcode Control register. This register provides control of the subcode interface.

SBXCK—bit 7—Subcode External Clock "1" selects an external clock from pin EXCK to be used by the subcode logic. "0" selects an internal clock to be used by the subcode logic. SBXCK is cleared to 0 by hardware reset, but is not changed by firmware reset.

SCEN—bit 6—Subcode Enable "1" enables the subcode logic. "0" disables the subcode logic. SCEN is cleared to 0 by hardware reset, but is not changed by firmware reset.

SCKB2—bit 5—Subcode Clock Divide By 2 "1" enables the divide by 2 logic (for internal or external clock). "0" disables the divide by 2 logic. SCKB2 is cleared to 0 by hardware reset, but is not changed by firmware reset.

SCIEN—bit 4—Subcode Interrupt Enable "1" enables activation of subcode interrupts to the microprocessor. "0" disables subcode interrupts. SCIEN is cleared to 0 by hardware reset, but is not changed by firmware reset.

EXINV—bit 3—External Clock Invert Select "1" selects an inverted output clock at pin EXCK if EXCK is set as an output. "0" selects a non-inverted clock. EXINV is cleared to 0 by hardware reset, but is not changed by firmware reset.

EXOP—bit 2—Pin EXCK Operation "1" sets EXCK as an output pin. "0" sets EXCK as an input pin. EXOP is cleared to 0 by hardware reset, but is not changed by firmware reset.

FIG. 66 is SBSEL1 and SBSEL0—bits 1 and 0—Subcode Format Select Table. The subcode format should be set according to the figure. SBSEL1 and SBSEL0 are cleared to 0 by hardware reset, but are not changed by firmware reset.

FIG. 67 is a description of UMISC (Miscellaneous Microcontroller Control) register. This register provides miscellaneous flags and control bits.

PDIAGb—read-bit 1—Pin HPDIAG- Flag "1" indicates that open-drain pin HPDIAG- is high (inactive). In this case, both master and slave drives are de-asserting pin HPDIAG-. "0" indicates that pin HPDIAG- is low (active) In this case, either the master or slave drive is setting pin HPDIAG- to active-low.

DASPb—read-bit 0—Pin HDASP- Flag "1" indicates that open-drain pin HDASP- is high (inactive). In this case, both master and slave drives are de-asserting pin HDASP-. "0" indicates that pin HDASP- is low (active). In this case, either the master or slave drive is setting pin HDASP- to active-low.

IDEIEN—write-bit 7—IDE Interrupt Enable "1" enables activation of IDE (ATA) interrupts to the microprocessor. "0" disables activation of IDE (ATA) interrupts. IDE interrupts (if enabled) are activated, and flag SRST, CMD, DIAGCMD, or HRST set in register RSSTAT (2Fh.7,6,5,0), whenever the BSY flag in the ATAPI status register is set automatically by: 1 written to bit SRST (Soft Reset) in the ATAPI Device Control Register (host address 3F6h) in the master or slave drive. Note: The BSY flag and IDE interrupt (if enabled) cannot be cleared while SRST is set to 1. Any command written to the ATAPI Command Register (host address 1F7h) while the drive is selected. Command Execute Drive Diagnostics (ATA opcode 90h) written to the master or slave drive. Note: if opcode 90h is written while the drive is selected, both flags CMD and DIAGCMD will be set.

Hardware Reset (however, hardware reset clears IDEIEN). Writing 1 followed by 0 to SETBSY in register HICTL (20h0.3) sets BSY and activates the interrupt (if enabled by IDEIEN) but does not set a status flag. The BSY flag and IDE interrupt are cleared by writing 1 followed by 0 to control bit CLRBSY in register HICTL (20h0.4). IDEIEN is cleared to 0 by hardware reset, but is not changed by firmware reset.

UMISC write-bit 6 should always be cleared to 0.

DRVEb—write-bit 5—Drive Enable "1" disables selection of the drive, whether bit DRV in the ATAPI Drive Select Register (host address 1F6h) is 0 or 1. "0" enables selection of the drive if bit DRV matches the setting of DRV1b in register UMISC. DRVEb is set to 0 (active) by hardware reset, but is not changed by firmware reset.

DRV1b—write-bit 4—Drive 1 "1" sets the drive to be selected when bit DRV in the ATAPI Drive Select Register is set to 0 (drive 0). "0" sets the drive to be selected when bit DRV in the ATAPI Drive Select Register is set to 1 (drive 1). DRV1b is set to 0 (drive 1) by hardware reset, but is not changed by firmware reset.

HINTRQ—write-bit 3—Host Interrupt Request "1" sets pin HIRQ high if the drive is selected and NIEN (Interrupt Enable) is enabled in the ATAPI Device Control Register (host address 3F6h). "0" clears pin HIRQ (to 0) if the drive is selected and NIEN is enabled. HINTRQ is automatically cleared to 0 by the following: Hardware reset, 1 written to bit SRST (Soft Reset) in the ATAPI Device Control Register (host address 3F6h) in the master or slave drive, any command written to the ATAPI Command Register (host address 1F7h) while the drive is selected, and a read from the ATAPI Status Register (host address 1F7h) while the drive is selected. HINTRQ is not changed by firmware reset, or by reads from the ATAPI Alternate Status Register (host address 3F6h). If the drive is not selected, or if NIEN is disabled (cleared to 1), pin HIRQ becomes high-impedance.

UMISC write-bits 2, 1, and 0 should always be set to 0.

FIG. 68 is a description of RSSTAT-Reset, IDE, and Subcode Status Register.

RSSTAT (Reset, IDE, and Subcode Status) register provides status flags for reset, IDE, and subcode logic.

SRSTF—bit 7—Soft Reset Flag "1" indicates that 1 has been written to bit SRST (Soft Reset) in the ATAPI Device Control Register (host address 3F6h) in the master or slave drive. "0" indicates that 1 has not been written to bit SRST. The BSY flag is set, and IDE interrupt to the microcontroller activated (if enabled), whenever SRST is set. BSY and IDE interrupt cannot be cleared until SRST is cleared to 0 (however, the IDE interrupt can be disabled). After SRST is cleared, the BSY flag and IDE interrupt are cleared by writing 1 followed by 0 to control bit CLRBSY in register HICTL (20h0.4). Flag SRSTF is cleared to 0 by hardware reset, but is not changed by firmware reset.

CMD—bit 6—ATA Command "1" indicates that a command has been written to the ATAPI Command Register (host address 1F7h) while the drive was selected. "0" indicates that a command has not been written. The BSY flag is set, and IDE interrupt to the microcontroller activated (if enabled), whenever a command is written to the ATAPI Command Register while the drive is selected. The BSY flag and IDE interrupt are cleared by writing 1 followed by 0 to control bit CLRBSY in register HICTL (20h0.4). CMD is cleared to 0 by hardware reset, but is not changed by firmware reset.

DIAGCMD—bit 5—Execute Drive Diagnostics Command "1" indicates that the ATA command Execute Drive Diagnostics (ATA opcode 90h) has been written to the master or slave drive. "0" indicates that Execute Drive Diagnostics has not been written. The BSY flag is set, and IDE interrupt to the microcontroller activated (if enabled), whenever Execute Drive Diagnostics is written to the ATAPI Command Register. If opcode 90h is written while the drive is selected, both flags CMD and DIAGCMD will be set. The BSY flag and IDE interrupt are cleared by writing 1 followed by 0 to control bit CLRBSY in register HICTL (20h0.4). DIAGCMD is cleared to 0 by hardware reset, but is not changed by firmware reset.

SINT—bit 4—Subcode Interrupt Flag "1" indicates that flag MISSY, SBKEND, or SILSY has been set in register STATS (22h0.2,1,0). "0" indicates that flag MISSY, SBKEND, or SILSY has not been set. If enabled by control bit SCIEN in register SUBCD (2Ch.4), a microcontroller interrupt is activated when SINT is set. SINT, interrupt, and the flag in register STATS are cleared by writing any value to STATS. SINT is cleared to 0 by hardware reset or firmware reset.

PARINT—bit 3—Parity Interrupt Flag "1" indicates that a parity error has been detected in the DRAM. "0" indicates that a parity error has not been detected. If enabled by control bit RPEN in register RAMCF (2Ah.3), a microcontroller interrupt is activated when PARINT is set. PARINT and the interrupt are cleared by writing 0 to RPEN. PARINT is cleared to 0 by hardware reset, but is not changed by firmware reset.

RST—bit 2—Reset Flag "1" indicates that the device is currently being reset. "0" indicates that the device is not currently being reset. RST allow the hardware reset to be monitored (if the microcontroller is not reset at the same time).

URST—bit 1—Firmware Reset Flag "1" indicates that the current or most recent reset was activated by writing to the register RESET (0Fh). "0" indicates that register RESET has not been active. The first read of RSSTAT following the end of the firmware reset cycle clears URST to 0. URST is cleared to 0 by hardware reset.

HRST—bit 0—Hardware Reset Flag indicates that the current or most recent reset was activated by hardware reset (pin RESET-). "0" indicates that pin RESET- has not been set to 0. The BSY flag is set whenever hardware reset is activated. The BSY flag and IDE interrupt are cleared by writing 1 followed by 0 to control bit CLRBSY in register HICTL (20h0.4). The first read of RSSTAT following the end of the hardware reset cycle clears HRST to 0. HRST is not changed by firmware reset.

FIGS. 69–75 are descriptions of ATAPI Task File Registers (TR). The Task File register bits are labeled according to the ATAPI Specification. FIG. 69 is a description of ATFEA and ATERR.

ATFEA—Output from Features TR-The host writes this register at host address 1F1h.

ATERR—Input to Error TR—The host reads this register at host address 1F1h.

FIG. 70 is a description of ATINT—I/O of Interrupt Reason TR—The host accesses this register at host address 1F2h. (1F2h is Sector Count in ATA Specification.)

FIG. 71 is a description of ATSPA—Spare TR (unused in ATAPI Specification)—The host accesses this register at host address 1F3h. (1F3h is Sector Number in ATA Specification.)

FIG. 72 is a description of ATBLO—I/O of Byte Count Low TR—The host accesses this register at host address 1F4h. (1F4h is Cylinder Low in ATA Specification.)

FIG. 73 is a description of ATBHI—I/O of Byte Count High TR—The host accesses this register at host address 1F5h. (1F5h is Cylinder High in ATA Specification.)

FIG. 74 is a description of ATDRS—I/O of Drive Select TR—The host accesses this register at host address 1F6h. Bit 4, DRV, selects drive 1 when high or drive 0 when low. Bit 6, L, should be set to 1 to select LBA (not CHS) addressing. Bit 4 (DRV) is set to 1 by hardware reset. (1F6h was Drive/Head Select in ATA Specification.)

FIG. 75 is a description of ATCMD—Output from Command Register—The host writes this register at host address 1F7h.

ATSTA—Input to Status Register—The host reads this register at host address 1F7h.

FIGS. 76–83 are descriptions of the Microcontroller to Host Data Transfer Registers. The microcontroller writes up to eight bytes of data to be transferred to UDTA0–7. The host reads these registers as data at host address 1F0h. UDTA0 is read first, and UDTA7 last. See the description of control bits UDTRG and UDATA in register HDDIR (1Fh.7, 6).

What is claimed is:

1. An apparatus comprising:
   a host interface in an optical drive controller, said host interface operable to be directly connected to a host computer via an IDE/ATA bus to communicate addresses, commands, and data through ATA command block register addresses, said host interface including a first buffer addressed by one said ATA command block register addresses and operable to store command packets, each of said command packets comprising multiple command bytes received through multiple writes by said host computer as part of a single command transfer and stored sequentially in said first buffer, wherein said first buffer provides a greater amount of storage than the width of said IDE/ATA bus.

2. The apparatus of claim 1, wherein said host interface is further operable to provide access by a microcontroller to data stored in locations addressed by at least certain of said ATA command block register addresses, said microcontroller operable to control reading of information from optical media.

3. The apparatus of claim 1, wherein said optical drive controller further comprises:
   a path operable to communicate said addresses and commands from the host interface to a microcontroller, said microcontroller operable to control reading of information from optical media.

4. The apparatus of claim 3 wherein said microcontroller is also operable to cause the assertion of signals on DASP and PDJAG lines of said IDE/ATA bus.

5. The apparatus of claim 3, wherein said microcontroller is also operable to cause the assertion of signals on an HJRQ line of said IDE/ATA bus to generate interrupts on said host computer.

6. The apparatus of claim 3, wherein:
   said host interface includes a status register addressed by another of said ATA command block register addresses, said status register including a BSY bit whose state indicates whether said host computer can access said ATA command block register addresses; and said microcontroller can cause said BSY bit to be altered to a state that allows access by said host computer.

7. The apparatus of claim 1, wherein said ATA command block register addresses address eight register locations.

8. The apparatus of claim 1, wherein said IDE/ATA bus includes, host address lines; and a host chip select line whose signal identifies whether signals on the host address lines are carrying one of said ATA command block register addresses.

9. The apparatus of claim 1, wherein host interface includes physical registers that are addressed by at least certain of said ATA command block register addresses.

10. The apparatus of claim 1, wherein said host interface supports all of the signals required by the ATA transfer protocol.

11. The apparatus of claim 1, wherein said IDE/ATA bus is at least 16 bits wide.

12. The apparatus of claim 1, wherein the one of said ATA command block register addresses that can be used to address said first buffer is the address of a data port in the ATA transfer protocol.

13. The apparatus of claim 1, wherein said host interface also includes a second buffer operable to store data to be transmitted to said host computer and addressed by the one of said ATA command block register addresses that can be used to address said first buffer.

14. The apparatus of claim 13, wherein said second buffer is a queue or FIFO.

15. The apparatus of claim 1, wherein said first buffer is a queue or FIFO.

16. The apparatus of claim 1, wherein said optical drive controller further comprises:

a path operable to allow a microcontroller, which controls reading of information from optical media, to read said first buffer.

17. The apparatus of claim 1, wherein said host interface includes a status register addressed by another of said ATA command block register addresses, said status register including a BSY bit.

18. The apparatus of claim 17, wherein said host interface alters said BSY bit when necessary to indicate when said host computer is precluded from accessing said ATA command block register addresses.

19. The apparatus of claim 17, wherein said host interface includes circuitry operable to clear the signal on an HIRQ line of said IDE/ATA bus responsive to said host computer reading said status register.

20. The apparatus of claim 17, wherein said host interface includes circuitry operable to alter said BSY bit, responsive to command events initiated by the host computer, to a state that precludes said host computer from accessing said ATA command block register addresses.

21. The apparatus of claim 20, wherein said optical drive controller further comprises:

a path operable to allow a microcontroller, which controls reading of information from optical media, to alter said BSY bit to a state that allows said host computer to access said ATA command block register addresses.

22. The apparatus of claim 17, wherein said host interface is operable to assert signals on DASP and PDIAG lines of said IDE/ATA bus according to the ATA transfer protocol.

23. The apparatus of claim 22, wherein said host interface is also operable to assert signals on an HIRQ line of said IDE/ATA bus according to the ATA transfer protocol.

24. The apparatus of claim 23, wherein said host interface includes circuitry operable to carry out initial signal transitions on said DASP, PDIAG, and HIRQ lines in response to soft reset and execute drive diagnostic command events.

25. The apparatus of claim 24, wherein said optical drive controller further comprises:

a path operable to allow a microcontroller, which controls reading of information from optical media, to control certain transitions of signals on said DASP, PDIAG, and HIRQ lines of said IDE/ATA bus.

26. The apparatus of claim 17, wherein said host interface is also operable to assert signals on DASP and PDIAG lines of said IDE/ATA bus responsive to power on reset or execute diagnostic commands received from said host computer.

27. The apparatus of claim 26, wherein said optical drive controller further comprises:

a path operable to allow a microcontroller, which controls reading of information from optical media, to cause the assertion of signals on DASP and PDIAG lines of said IDE/ATA bus.

28. The apparatus of claim 1, wherein said host interface includes a drive/head register addressed by another of said ATA command block register addresses, said drive/head register including a DRV bit.

29. The apparatus of claim 28, wherein said host interface uses said DRV bit to determine whether to store command information in said first buffer.

30. The apparatus of claim 1, wherein said host interface is also operable to communicate control signals on at least certain control lines of said IDE/ATA bus.

31. The apparatus of claim 30, wherein said control lines include HIRQ, DASP, and PDIAG.

32. The apparatus of claim 1, wherein said host interface is also operable to assert signals on an HIRQ line of said IDE/ATA bus according to the ATA transfer protocol.

33. The apparatus of claim 1, wherein said host interface is also operable to assert signals on an HIRQ line of said IDE/ATA bus to alert said host computer during data transfers.

34. The apparatus of claim 1, wherein said host interface is also operable to assert signals on an HIRQ line of said IDE/ATA bus to allow said host computer to engage in multi-tasking.

35. An apparatus comprising:

a host interface of an optical drive controller, said host interface operable to be directly connected to a host computer via an IDE/ATA bus to communicate addresses, commands, and data through ATA command block register addresses, said ATA command block register addresses belonging to a register address map specified by an IDE/ATA bus protocol, at least one of said ATA command block register addresses providing access to a multi-byte command packet bufkr that can store multiple writes by the host computer of command information as part of the same command and that provides a greater amount of storage than the width of said IDE/ATA bus.

36. The apparatus of claim 35, wherein said host interface is further operable to provide access by a microcontroller to data stored in locations addressed by at least certain of said ATA command block register addresses, said microcontroller operable to control reading of information from optical media.

37. The apparatus of claim 35, wherein said optical drive controller further comprises:

a path operable to communicate said addresses and commands from the host interface to a microcontroller, said microcontroller operable to control reading of information from optical media.

38. The apparatus of claim 37, wherein said microcontroller is also operable to cause the assertion of signals on DASP and PDIAG lines of said IDE/ATA bus.

39. The apparatus of claim 37, wherein said microcontroller is also operable to cause the assertion of signals on an HIRQ line of said IDE/ATA bus to generate interrupts on said host computer.

40. The apparatus of claim 37, wherein:
said host interface includes a status register addressed by another of said ATA command block register addresses, said status register including a BSY bit whose state indicates whether said host computer can access said ATA command block register addresses; and
said microcontroller can cause said BSY bit to be altered to a state that allows access by said host computer.

41. The apparatus of claim 35, wherein said ATA command block register addresses address eight register locations.

42. The apparatus of claim 35, wherein said IDE/ATA bus includes,
host address lines; and
a host chip select line whose signal identifies whether signals on the host address lines are carrying one of said ATA command block register addresses.

43. The apparatus of claim 35, wherein host interface includes physical registers that are addressed by at least certain of said ATA command block register addresses.

44. The apparatus of claim 35, wherein said host interface supports all of the signals required by the ATA transfer protocol.

45. The apparatus of claim 35, wherein said IDE/ATA bus is at least 16 bits wide.

46. The apparatus of claim 35, wherein the one of said ATA command block register addresses that can be used to address said multi-byte command packet buffer is the address of a data port in the ATA transfer protocol.

47. The apparatus of claim 35, wherein said host interface also includes a multi-byte data buffer operable to store data to be transmitted to said host computer and addressed by the one of said ATA command block register addresses that can be used to address said multi-byte command packet buffer.

48. The apparatus of claim 47, wherein said multi-byte data buffer is a queue or FIFO.

49. The apparatus of claim 35, wherein said multi-byte command packet buffer is a queue or FIFO.

50. The apparatus of claim 35, wherein said optical drive controller further comprises:
a path operable to allow a microcontroller, which controls reading of information from optical media, to read said multi-byte command packet buffer.

51. The apparatus of claim 35, wherein said host interface includes a status register addressed by another of said ATA command block register addresses, said status register including a BSY bit.

52. The apparatus of claim 51, wherein said host interface alters said BSY bit when necessary to indicate when said host computer is precluded from accessing said ATA command block register addresses.

53. The apparatus of claim 51, wherein said host interface includes circuitry operable to clear the signal on an HIRQ line of said IDE/ATA bus responsive to said host computer reading said status register.

54. The apparatus of claim 51, wherein said host interface includes circuitry operable to alter said BSY bit, responsive to command events initiated by the host computer, to a state that precludes said host computer from accessing said ATA command block register addresses.

55. The apparatus of claim 54, wherein said optical drive controller further comprises:
a path operable to allow a microcontroller, which controls reading of information from optical media, to alter said BSY bit to a state that allows said host computer to access said ATA command block register addresses.

56. The apparatus of claim 54, wherein said host interface is operable to assert signals on DASP and PDJAG lines of said IDE/ATA bus according to the ATA transfer protocol.

57. The apparatus of claim 56, wherein said host interface is also operable to assert signals on an HIRQ line of said IDE/ATA bus according to the ATA transfer protocol.

58. The apparatus of claim 57, wherein said host interface includes circuitry operable to carry out initial signal transitions on said DASP, PDIAG, and HIRQ lines in response to soft reset and execute drive diagnostic command events.

59. The apparatus of claim 58, wherein said optical drive controller further comprises:
a path operable to allow a microcontroller, which controls reading of information from optical media, to control certain transitions of signals on said DASP, PDIAG, and HIRQ lines of said IDE/ATA bus.

60. The apparatus of claim 51, wherein said host interface is also operable to assert signals on DASP and PDIAG lines of said IDE/ATA bus responsive to power on reset or execute diagnostic commands received from said host computer.

61. The apparatus of claim 60, wherein said optical drive controller further comprises:
a path operable to allow a microcontroller, which controls reading of information from optical media, to cause the assertion of signals on DASP and PDIAG lines of said IDE/ATA bus.

62. The apparatus of claim 35, wherein said host interface includes a drive/head register addressed by another of said ATA command block register addresses, said drive/head register including a DRV bit.

63. The apparatus of claim 62, wherein said host interface uses said DRV bit to determine whether to store command information in said multi-byte command packet buffer.

64. The apparatus of claim 35, wherein said host interface is also operable to communicate control signals on at least certain control lines of said IDE/ATA bus.

65. The apparatus of claim 64, wherein said control lines include HIRQ, DASP, and PDIAG.

66. The apparatus wherein said host interface is also operable to assert signals on an HIRQ line of said IDE/ATA bus according to the ATA transfer protocol.

67. The apparatus of claim 35, wherein said host interface is also operable to assert signals on an HIRQ line of said IDE/ATA bus to alert said host computer during data transfers.

68. The apparatus of claim 35, wherein said host interface is also operable to assert signals on an HIRQ line of said IDE/ATA bus to allow said host computer to engage in multi-tasking.

* * * * *

UNITED STATES PATENT AND TRADEMARK OFFICE
CERTIFICATE OF CORRECTION

PATENT NO. : 6,968,404 B2
DATED : November 22, 2005
INVENTOR(S) : Verinsky et al.

It is certified that error appears in the above-identified patent and that said Letters Patent is hereby corrected as shown below:

Column 17,
Line 40, delete "(36h and" and insert -- (36h) and in the ATAPI Drive Select Register, and --.

Column 18,
Line 47, delete "SLBHO-3" and insert -- SUBHO-3 --.

Column 19,
Line 42, delete "LRTBSY" and insert -- URTBSY --.

Column 26,
Line 16, delete "(20h0.3)" and insert -- (20h.3) --.
Line 19, delete "(20h0.4)" and insert -- (20h.4) --.

Column 27,
Lines 7, 21, and 57, delete "(20h0.4)" and insert -- (20h.4) --.
Line 25, delete "(22h0.2,1,0)." and insert -- (22h.2,1,0). --.

Column 28,
Line 60, delete "PDJAG" and insert -- PDIAG --.
Line 62, delete "HJRQ" and insert -- HIRQ --.

Column 30,
Line 53, delete "bufkr" and insert -- buffer --.

UNITED STATES PATENT AND TRADEMARK OFFICE
CERTIFICATE OF CORRECTION

PATENT NO. : 6,968,404 B2
DATED : November 22, 2005
INVENTOR(S) : Verinsky et al.

It is certified that error appears in the above-identified patent and that said Letters Patent is hereby corrected as shown below:

Column 32,
Line 15, delete "PDJAG" and insert -- PDIAG -- .

Signed and Sealed this

Twenty-eighth Day of February, 2006

JON W. DUDAS
*Director of the United States Patent and Trademark Office*